United States Patent
Nomura et al.

[11] Patent Number: 5,949,390
[45] Date of Patent: Sep. 7, 1999

[54] THREE-DIMENSIONAL DISPLAY APPARATUS WITH A WIDE VIEWING ANGLE AND INCREASED RESOLUTION

[75] Inventors: Toshio Nomura, Ichihara; Masayuki Katagiri, Ikoma; Keisuke Iwasaki, Ikoma-gun; Noritoshi Kako, Chiba, all of Japan

[73] Assignee: Sharp Kabushiki Kaisha, Osaka, Japan

[21] Appl. No.: 08/671,419

[22] Filed: Jun. 27, 1996

[30] Foreign Application Priority Data

Jun. 27, 1995 [JP] Japan ................................ 7-161162

[51] Int. Cl.$^6$ .......................... G09G 3/00; G02B 27/22
[52] U.S. Cl. ...................... 345/32; 345/419; 348/54; 359/466
[58] Field of Search ........................ 345/32, 419, 6; 359/466–477; 348/51, 54, 56; 353/7

[56] References Cited

U.S. PATENT DOCUMENTS

| | | | |
|---|---|---|---|
| 4,829,365 | 5/1989 | Eichenlaub | 348/54 |
| 5,315,377 | 5/1994 | Isono et al. | 348/51 |
| 5,349,379 | 9/1994 | Eichenlaub | 348/54 X |
| 5,519,533 | 5/1996 | Nomura et al. | 359/32 X |
| 5,576,725 | 11/1996 | Shimada | 345/32 |
| 5,629,797 | 5/1997 | Ridgway | 359/466 X |
| 5,663,831 | 9/1997 | Mashitani et al. | 359/466 X |

FOREIGN PATENT DOCUMENTS 5-191838  7/1993  Japan .

OTHER PUBLICATIONS

H. Isono et al., "Autostereoscopic 3–D Television," in *The Journal of the Institute of Electronics, Information and Communication Engineers*, vol. J76–C–II, No. 1, pp. 16–23, 1993.

*Primary Examiner*—Steven J. Saras
*Assistant Examiner*—Seth D. Vail
*Attorney, Agent, or Firm*—Dike, Bronstein, Roberts & Cushman, LLP; David G. Conlin

[57] ABSTRACT

A three-dimensional display apparatus includes a liquid crystal panel 1 for displaying a discrete Fourier transformed image and a slit panel 2 having a convex lens function in a horizontal direction and a plurality of slits 3 arranged in a zig-zag manner, which is disposed in front of the liquid crystal panel 1. Since a spatial image is generated by such a configuration, a wide viewing region can be obtained. Since the number of slits positioned in the horizontal direction is increased as that of a slit pattern of a conventional slit array, the deterioration of resolution in the horizontal direction is reduced. Furthermore, since the slits are arranged in a zig-zag manner, the area of each light-shielding portion between sampling positions is reduced, thereby preventing an optical means from obstructing the observation of images.

16 Claims, 17 Drawing Sheets

THREE-DIMENSIONAL DISPLAY APPARATUS WITH A WIDE VIEWING ANGLE AND INCREASED RESOLUTION

BACKGROUND OF THE INVENTION

1. Field of the Invention

The present invention relates to a threedimensional display apparatus for reproducing a stereoscopic view. In particular, the present invention relates to a three-dimensional display apparatus which does not require an observer to use viewing aids such as a pair of special purpose spectacles.

2. Description of the Related Art

A three-dimensional display apparatus in a binocular parallax mode (parallax barrier mode) is conventionally used as a three-dimensional display apparatus which allows an observer to view a stereoscopic image without viewing aids such as a pair of spectacles. Such a three-dimensional display apparatus is described in, for example, "THE JOURNAL OF THE INSTITUTE OF ELECTRONICS, INFORMATION AND COMMUNICATION ENGINEERS" C-II, Vol. J76-C-II, No. 1, pp. 16–23, January 1993.

FIG. 25 shows the basic structure of a display section in a three-dimensional display apparatus in a conventional parallax barrier mode. A display section 110 includes an image display panel 101 and a slit array panel 102 which is disposed in front of the image display panel 101. As shown in FIG. 27, the slit array panel 102 includes a plurality of strip-shaped non-transparent portions 105 and a plurality of strip-shaped transparent portions 106 which are alternately disposed at a pitch T. In the case where double-window display is performed, a plurality of strip-shaped images for the left eye (L) and a plurality of strip-shaped images for the right eye (R) are alternately disposed on the image display panel 101 at a pitch V as shown in FIG. 26. The pitch V of the strip-shaped images is set to be slightly larger than the slit pitch T shown in FIG. 27. Such a configuration enables the stereoscopic view. More specifically, as shown in FIG. 28, the strip-shaped images for the left eye (L) and the strip-shaped images for the right eye (R) displayed on the image display panel 101 are separated through the slit array panel 102 disposed in front of the image display panel 101 so as to be converged to two different spacial positions. Therefore, by setting the left eye 103 and the right eye 104 of an observer to the positions to which images are converged, the observer can observe a stereoscopic image. The positions of both eyes, i.e., a viewing region, are determined in accordance with the relationship between the slit pitch T and the pitch V of the strip-shaped images.

The aforementioned three-dimensional display apparatus in the conventional parallax barrier mode and another conventional three-dimensional display apparatus in a parallax image mode have an extremely narrow viewing region since light beams are converged to the positions of right and left eyes. In particular, since images at a plurality of viewing points are displayed on one image display panel in the three-dimensional display apparatus in a parallax barrier mode, the resolution of a reproduced image in a horizontal direction is deteriorated. The resolution in the horizontal direction is reduced to be half in a stereoscopic mode and to be one-third in a three views mode, as compared with that of a normal two-dimensional reproduced image. In addition, the slit array panel itself obstructs observation of images.

SUMMARY OF THE INVENTION

The three-dimensional display apparatus of the present invention includes at least one image display device, the image display device including a display device and an optical device, wherein the display device includes a plurality of pixel groups, each including a plurality of display pixels arranged in a first direction, the optical device includes a plurality of sampling portions transmitting light, arranged in the first direction and in a second direction orthogonal to the first direction, each being optically coupled with each of the plurality of pixel groups, and the sampling portions adjacent each other in the second direction are disposed at different positions in the first direction.

In one embodiment of the invention, each of the plurality of sampling portions is a slit which is long in a second direction perpendicular to the first direction.

In another embodiment of the invention, a length of the slit is shorter than a length of each of the plurality of pixel groups along the second direction.

In still another embodiment of the invention, a length of the slit is twice a length of each of the plurality of pixel groups along the second direction.

In still another embodiment of the invention, each of the plurality of sampling portions is a cylindrical lens.

In still another embodiment of the invention, the display device displays a discrete Fourier transformed image.

In still another embodiment of the invention, the display device displays an image containing parallax information.

In still another embodiment of the invention, the optical device includes a plurality of first lines each being provided with a plurality of sampling portions at a first pitch and a plurality of second lines each being provided with a plurality of sampling portions at a second pitch, and the plurality of first lines and the plurality of second lines are alternately provided.

In still another embodiment of the invention, positions of the plurality of sampling portions are represented by (X, Y)=(2I−1, 2J−1) and (X, Y)=(2I, 2J), where X is a position in the first direction, Y is a position in the second direction, and I and J are positive integers.

In still another embodiment of the invention, positions of the plurality of sampling portions are represented by (X, Y)=(4I−3, 4J−3), (X, Y)=(4I−2, 4J−2), (X, Y)=(4I−1, 4J−1) and (X, Y)=(4I, 4J), where X is a position in the first direction, Y is a position in the second direction, and I and J are positive integers.

In still another embodiment of the invention, positions of the plurality of sampling portions are represented by (X, Y)=(2I−1, 2J−1) and (X, Y)=(4I−2, 2J), where X is a position in the first direction, Y is a position in the second direction, and I and J are positive integers.

In still another embodiment of the invention, positions of the plurality of sampling portions are represented by (X, Y)=(2I−1, 2J−1), (X, Y)=(4I−2, 4J−2) and (X, Y)=(4I, 4J), where X is a position in the first direction, Y is a position in the second direction, and I and J are positive integers.

In still another embodiment of the invention, positions of the plurality of sampling portions are represented by (X, Y)=(2I−1, 4J−3), (X, Y)=(2I−1, 4J−2), (X, Y)=(2I, 4J−1) and (X, Y)=(2I, 4J), where X is a position in the first direction, Y is a position in the second direction, and I and J are positive integers.

In still another embodiment of the invention, the optical device has a predetermined thickness along a direction perpendicular to the first direction and the second direction to prevent crosstalk in the second direction from occurring.

In still another embodiment of the invention, the three-dimensional display apparatus further includes another optical device to prevent crosstalk in the second direction from occurring.

In still another embodiment of the invention, the three-dimensional display apparatus includes a plurality of the image display devices for respectively displaying images and a beam combiner, wherein the beam combiner optically synthesizes the images displayed by the plurality of image display devices.

In still another embodiment of the invention, the image display device includes light-shielding films between the display device and the optical device, each of the light-shielding films traverses boundaries of the plurality of lines and boundaries of the plurality of pixel groups.

Thus, the invention described herein makes possible the advantages of providing a three-dimensional display apparatus for reproducing a stereoscopic image, which allows an observer to view a stereoscopic view without viewing aids.

By placing the slits in the slit panel in a zigzag manner, the number of sampling points in a horizontal direction increases as compared with that of the slit pattern of the conventional slit array panel. As a result, the deterioration of resolution in the horizontal direction can be reduced. Furthermore, since the area of each light-shielding portion between the slits can be reduced, the slit panel can be prevented from obstructing the observation of an image.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described in detail by way of illustrative examples.

EXAMPLE 1

Figure 1:
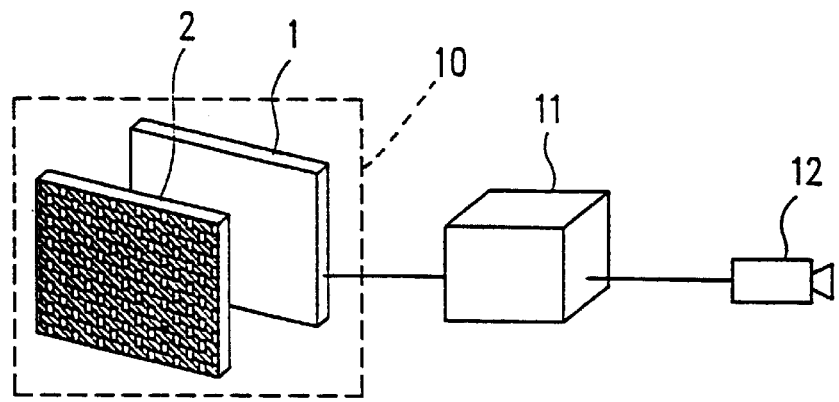
FIG. 1 is a schematic view showing a basic structure of a three-dimensional display apparatus according to the present invention and described in Example 1.

With reference to FIG. 1, the basic configuration of a three-dimensional display apparatus according to Example 1 of the present invention will be described. The three-dimensional display apparatus includes an image display section 10, an image processing section 11 and an image input section 12. The image input section 12 is, for example, a camera for obtaining stereoscopic image information or a device for recording/reproducing stereoscopic image information. The image display section 10 includes a liquid crystal panel 1 for displaying information of a discrete Fourier transformed image, a slit panel 2 positioned at a specific distance from the liquid crystal panel 1 so as to be parallel therewith, and a light source (not shown) for emitting a light beam onto the liquid crystal panel 1. Since the slit panel 2 has a plurality of slits (sampling means) arranged in a zig-zag manner, the slit panel 2 has a function of a convex lens in a horizontal direction. The image input section 12 is connected to the liquid crystal panel 1 of the image display section 10 via the image processing section 11. Stereoscopic image information input to the image input section 12 is processed in the image processing section 11 so as to be displayed on the liquid crystal panel 1.

Besides the liquid crystal panel, a plasma display panel or an electro-luminescent (EL) panel can be used as an image display panel.

Figure 2:
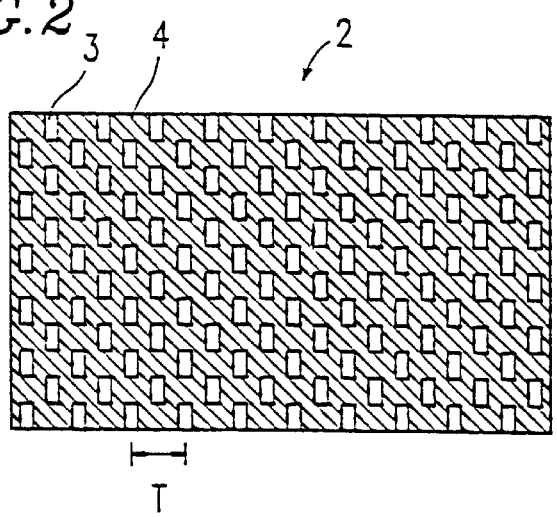
FIG. 2 is a front view showing part of a zig-zag slit panel 2 shown in FIG. 1.

Next, the slit panel 2 will be specifically described with reference to FIG. 2. The slit panel 2 includes a plurality of slits 3 for transmitting light therethrough and a non-transparent region 4 corresponding to the region other than the slits 3. The slits 3 are arranged in a zig-zag manner. In FIG. 2, a pitch of the slits 3 in the horizontal direction is represented by T.

Figure 3A:
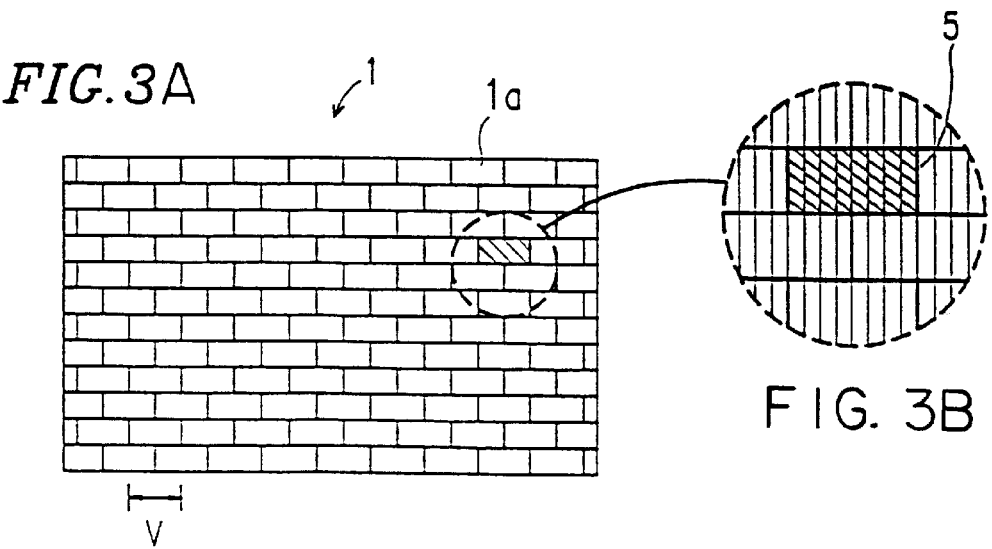
FIG. 3A is a front view showing part of a liquid crystal panel 1 shown in FIG. 1
Figure 3B:
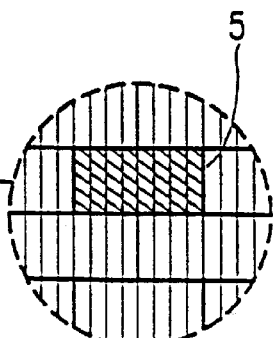
FIG. 3B shows the details thereof in an enlarged manner.

Each of rectangular regions 1a running horizontally on the liquid crystal panel 1 shown in FIG. 3 corresponds to each of the slits 3. The slits 3 of the slit panel 2 are arranged in a zig-zag manner. Accordingly, the rectangular regions 1a are also arranged in a zig-zag manner. One of the rectangular regions 1a is shown in an enlarged manner in a dotted circle of FIG. 3B. One rectangular region 1a consists of a plurality of horizontally arranged pixels 5. In FIGS. 3B and 3A, eight pixels 5 constitutes one rectangular pixel group 1a. A repetitive pitch V of the regions 1a may be basically the same as the pitch T of the slits 3 shown in FIG. 2.

Figure 4:
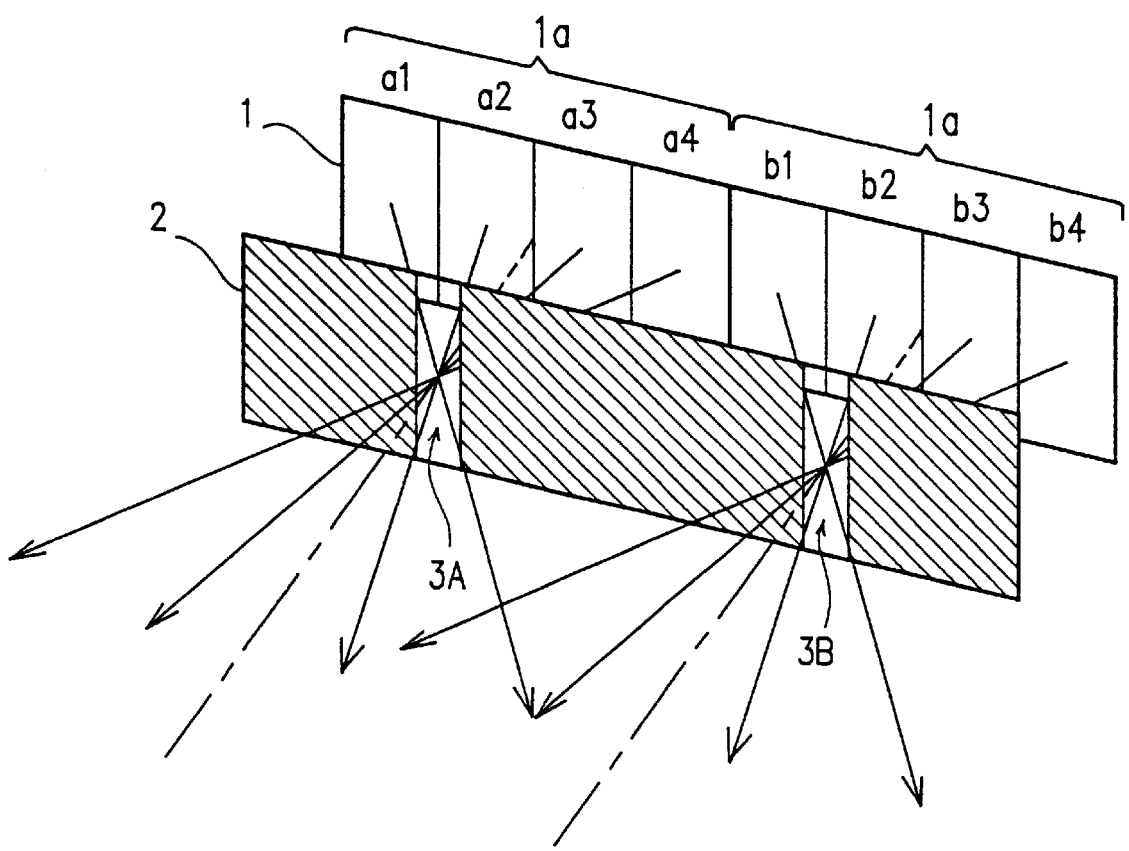
FIG. 4 is a schematic view showing the correspondence of reproduction of light beams using the combination of the liquid crystal panel 1 and the zig-zag slit panel 2 shown in FIG. 1.

The light beams passing from the regions 1a of the liquid crystal panel 1 through the slits 3 of the slit panel 2 are tracked. The results are represented with arrows in solid lines shown in FIG. 4. For ease of visibility, FIG. 4 shows the case where one pixel group 1a consists of four pixels. Dash-dot lines represent normals with respect to planes of the liquid crystal panel 1 and the slit panel 2. Pixels a1 to a4 correspond to a slit 3A, while pixels b1 to b4 correspond to a slit 3B. The directions of light beams, which are emitted from the respective pixels a1 to a4 and pass through the slit 3A, are defined by the relative positional relationship between the pixels a1 to a4 and the slit 3A. Similarly, the relative positional relationship between the pixels b1 to b4 and the slit 3B determines the directions of light beams passing through the slit 3B.

Next, the principle of reproduction of a stereoscopic image using the aforementioned liquid crystal panel 1 and slit panel 2 will be described.

The principle of reproduction of a stereoscopic image according to Example 1 is based on the formation of a spatial image as in the case of holography. The spatial image is formed by recording/reproducing the directions and intensities of light beams emitted from a subject. This method differs from a binocular parallax mode (for example, a parallax barrier mode) for providing parallax between two images respectively viewed by right and left eyes.

Figure 5:
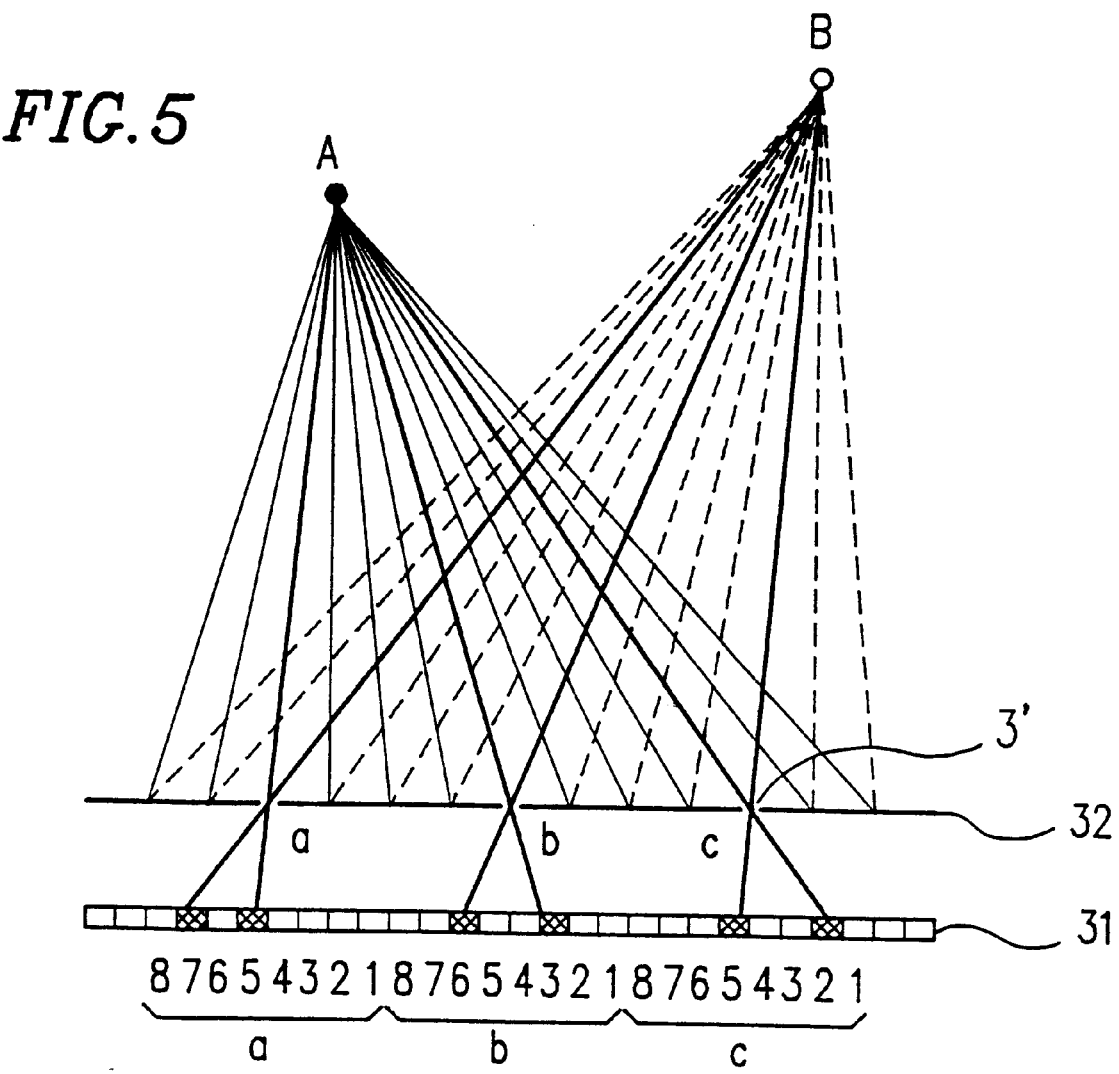
FIG. 5 is a cross-sectional view showing a photodetection face and a slit array for explaining the principle of generation of a discrete Fourier transformed image.

FIG. 5 is a schematic view illustrating the principle of recording of a stereoscopic view, which shows a horizontal cross-section of a photodetector 31 and a slit array panel 32. In FIG. 5, the photodetector 31 is an apparatus for detecting light per pixel as a CCD device. The slit array panel 32 is placed in front of the photodetector 31 so as to be at a predetermined distance therefrom. In this example, eight pixels on the photodetector 31 are allocated to one slit 3'. More specifically, the pitch of slits is equal to a horizontal length of eight detecting pixels. Since an imaging device such as a CCD device is used as the photodetector 31, only the light intensity is recorded and not the phase information of light. The light beams are discretely sampled only in the horizontal direction because of use of the slit array panel 32. As a result, the photodetector 31 detects a discrete Fourier transformed image. The stereoscopic information input section 12 shown in FIG. 1 serves as an imaging apparatus having such a function, or an apparatus for recording the image information detected by such an imaging apparatus.

Hereinafter, the recording of such a discrete Fourier transformed image will be described more in detail.

As shown in FIG. 5, light beams are scattered from a subject in all directions. Only the light beams passing through the slit 3' of the slit array panel 32 reach the photodetector 31. In view of the horizontal direction, only the light beams incident on the pixel a1 at an angle determined based on the positional relationship between the pixel a1 and the corresponding slit is recorded in one pixel a1 on the photodetector 31. It is assumed that there are two object points A and B as subjects as shown in FIG. 5. The object point A is recorded in pixels a5, b3 and c2 on the photodetector 31, and the object point B is recorded in the pixels a7, b6 and c5. Although the components of light in a vertical direction are required to be converged onto the detecting face using a lens, the description thereof is herein omitted because it is not directly related to the principle of reproduction of a stereoscopic image.

Figure 6:
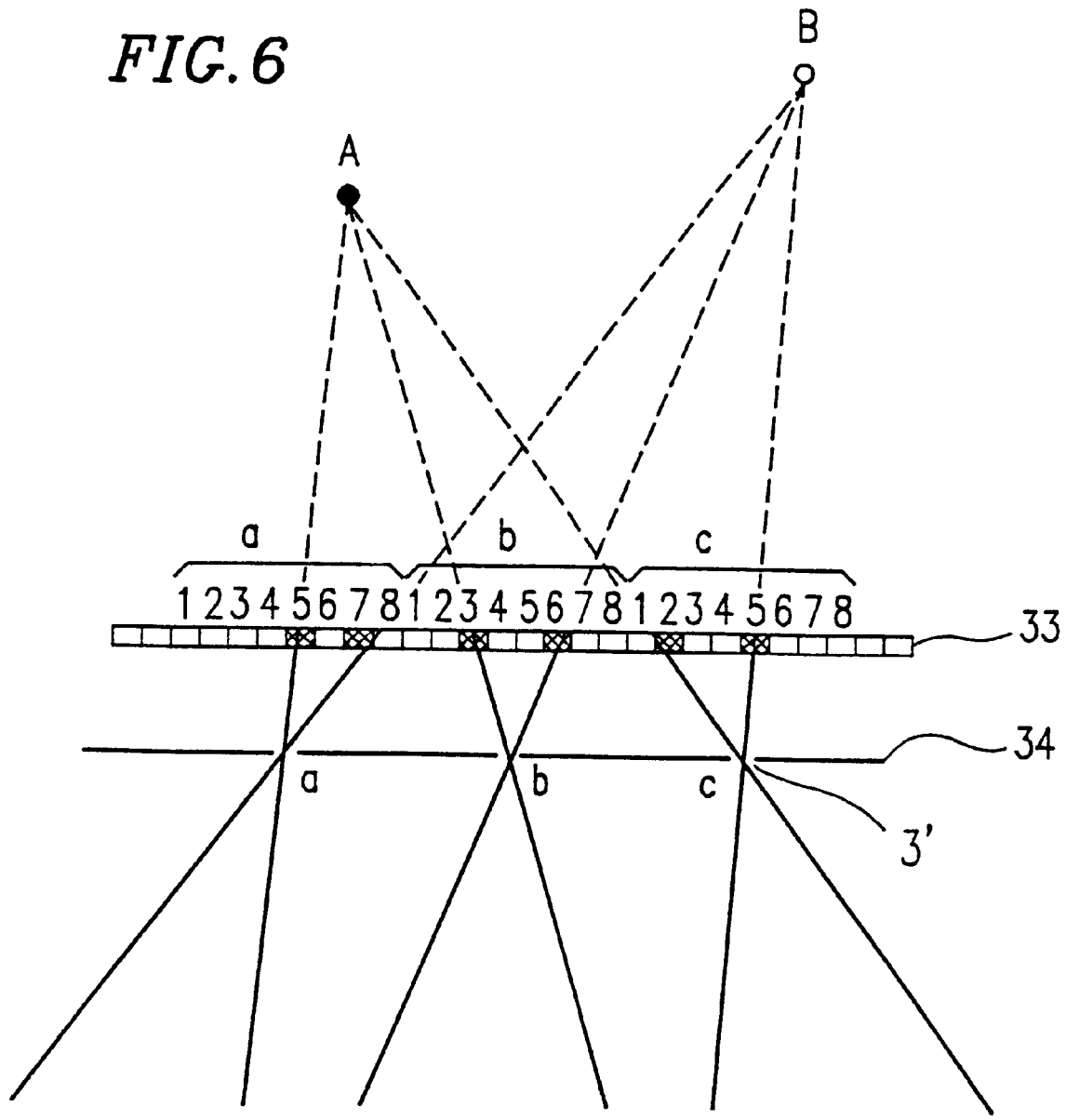
FIG. 6 is a cross-sectional view showing a display face and a slit array for illustrating the principle of reproduction of a discrete Fourier transformed image.

Next, with reference to FIG. 6, the principle of reproduction of discrete Fourier transformed image information will be described. FIG. 6 shows a horizontal cross-section of a display device 33 and a slit array panel 34 as in FIG. 5.

Similarly to the liquid crystal panel, the display device 33 performs a display by the unit of pixel. The slit array panel 34 is placed in front of the display device 33. Since eight pixels of the photodetector 31 are allocated to one slit during recording, eight pixels of the display device 33 are also allocated to one slit during reproduction. Therefore, the slit pitch of the slit array panel 34 is equal to a horizontal length of eight display pixels. If the pixel pitch of the display device 33 is equal to that of the photodetector 31 shown in FIG. 5, the slit pitch of the slit array panel 34 is set so as to be equal to that of the slit array panel 32 shown in FIG. 5. The distance between the display device 33 and the slit array panel 34 is set so as to be equal to the distance between the photodetector 31 and the slit array panel 32 shown in FIG. 5.

The image displayed on the display device 33 is obtained by reversing right and left of the image recorded by the apparatus having a configuration as shown in FIG. 5 for each slit. The right and left of the image are reversed for each slit in order to prevent the fore part and the back part of the reproduced image from being reversed in a depth direction. This results from the fact that the slit array panel 34 is close to an observer with respect to the display device 33 during reproduction while the slit array panel 32 is close to a subject with respect to the photodetector 31 during recording. The reversal process of an image is performed in the image processing section 11 shown in FIG. 1.

The light beam emitted from one pixel to pass through the slit travels only in the direction determined by the positional relationship between the pixel and the corresponding slit. Since the display pixel and the photodetection pixel are symmetrically positioned relative to the slit, a travelling direction of the light beam is the same as that during detection. Therefore, the light beams pass through the slit array panel 34 to travel in the same directions as those during the detection for all display points on the display device 33. The actual light beams travel in a forward direction (that is, in a direction toward an observer) from the display device 33. Since information of one point travels from a plurality of pixels (for example, pixels a5, b3 and c2) via a plurality of corresponding slits (a, b and c) at different angles, the observer perceives as if the light beams travel from one object point present far behind the display device 33. Since such a phenomenon occurs for all display points, a spatial image is formed. Thus, the observer can perceive a stereoscopic image.

In the case where the pixel pitch of the display device 33 shown in FIG. 6 differs from that of the photodetector 31 shown in FIG. 5, the recorded light beams can be similarly reproduced by adjusting the distance between the display device 33 and the slit array panel 34.

By forming a spatial image in this way, the equivalent light beams to those in a natural state can be reproduced. Therefore, a viewing region, over which an observer can perceive a stereoscopic image, can be extended. Furthermore, even when the observer moves, the observer can still perceive a stereoscopic image which smoothly changes in accordance with the movement of the observer.

As described above, in the method according to Example 1 of the present invention, the positions of slits serve as sampling positions. Therefore, the resolution of a reproduced image depends on the number of sampling points, that is, the number of slits. The case where the number of pixels included in a liquid crystal panel used for display is m×n will be considered. Herein, m represents the number of pixels in a horizontal direction of the liquid crystal panel, and n represents the number of pixels in a vertical direction of the liquid crystal panel. If one slit corresponds to eight display pixels, the resolution of a reproduced image is represented by (m/8)×n. In this way, if a plurality of pixels are allocated to one slit, the horizontal resolution of the reproduced image is deteriorated.

Accordingly, in Example 1, the slit panel 2 having a slit pattern as shown in FIG. 2 is used instead of a conventional slit array panel so as to increase the horizontal resolution. The function of the slit panel 2 will be described in comparison with the function of a slit pattern of a conventional slit panel.

Figure 7A:
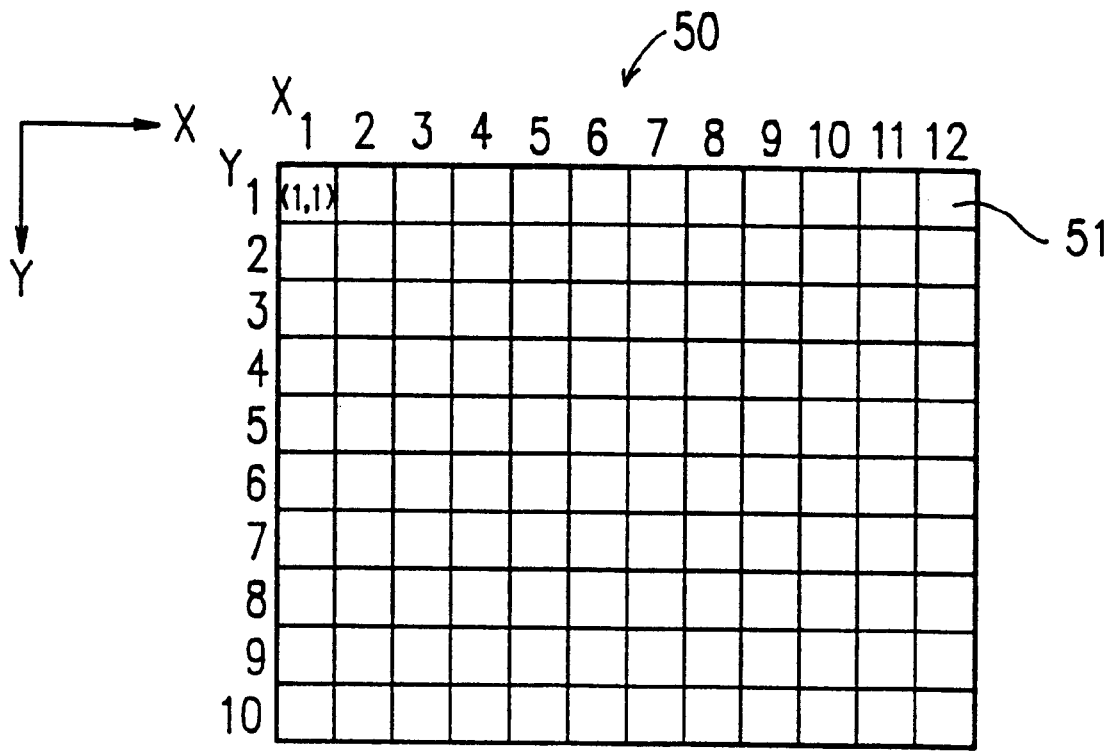
FIG. 7A is a plan view showing a plurality of blocks in the plane of the zig-zag slit panel 2 shown in FIG. 1.
Figure 7B:
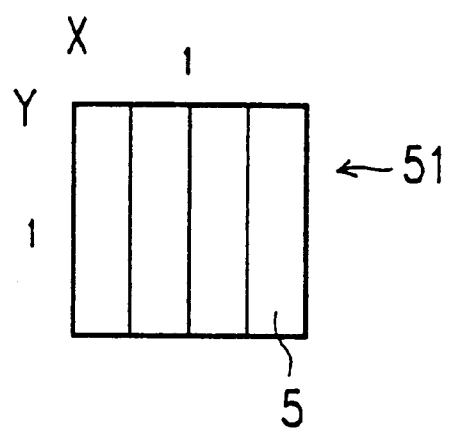
FIG. 7B is a plan view specifically showing one of the blocks shown in FIG. 7A.

For specifically showing the arrangement of slits on the slit panel 2, X-Y coordinates are introduced to a plane in which the slit panel 2 is placed during display, so as to define "a compartmentalized plane 50" shown in FIG. 7A. In order to define the compartmentalized plane 50, one X-Y plane is compartmentalized into regions along an X direction and a Y direction in a lattice-like manner. A plurality of regions defined by dotted lines on the X-Y plane are denoted as blocks 51. The position of each block 51 is represented by coordinates (X,Y), where X and Y are respectively natural numbers. In this case, the position of the block 51 at the upper left corner is represented by coordinates (1,1). FIG. 7A only partially shows the plane in which the slit panel 2 is placed. The size of each one of the blocks 51 is equal to the total size of four display pixels 5 of the liquid crystal panel 3 as shown in FIG. 7B.

Figure 8:
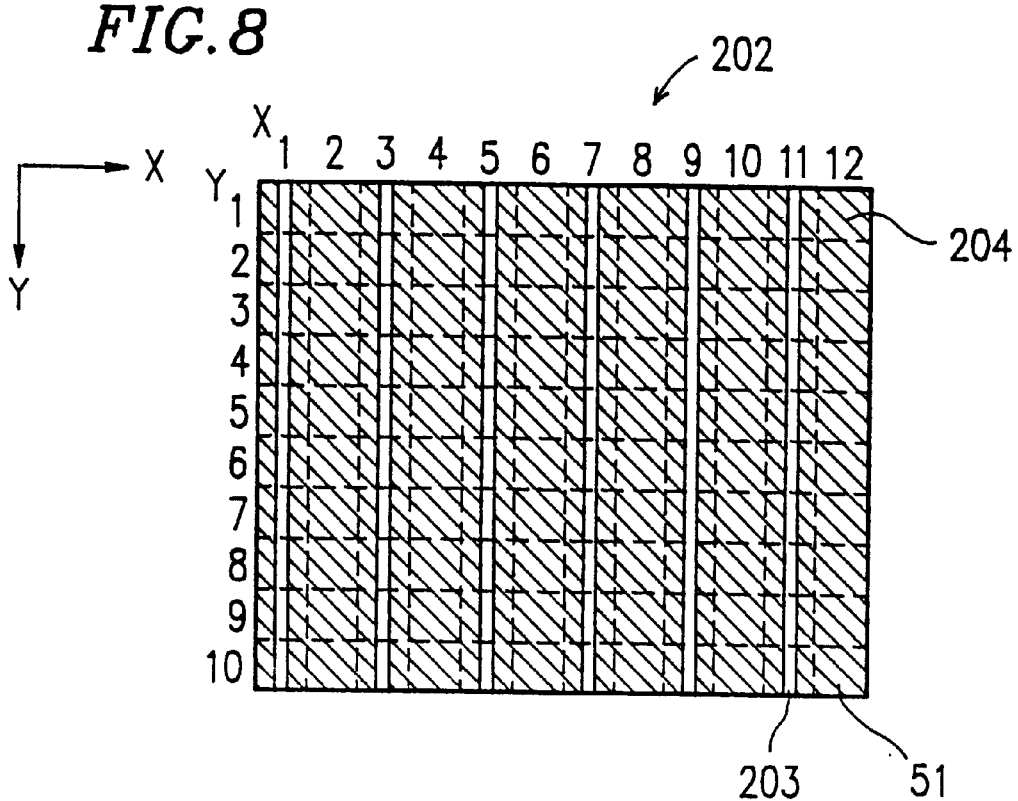
FIG. 8 is a plan view showing a pattern of a conventional slit array panel.

First, the slit pattern of a conventional slit panel 202 will be described for comparison. FIG. 8 shows the conventional slit array panel 202 on which the compartmentalized plane 50 defined in FIGS. 7A and 7B is overlapped. Slits 203 are continuously formed in a stripe-shaped manner along the Y direction. One slit 203 is allocated to two blocks 51 in the X direction. Since one block 51 corresponds to four display pixels of a liquid crystal panel (not shown) along the X direction of the slit array panel 202, eight display pixels correspond to one slit. The positions of slits in FIG. 8 are expressed by the following Equation 1.

$$X=2I-1 (I=1,2 \ldots) \qquad \text{[Equation 1]}$$

Information of the display pixels corresponding to the blocks 51 present at the positions expressed by the following Equation 2 cannot be reproduced.

$$X=2I (I=1,2 \ldots) \qquad \text{[Equation 2]}$$

Figure 9:
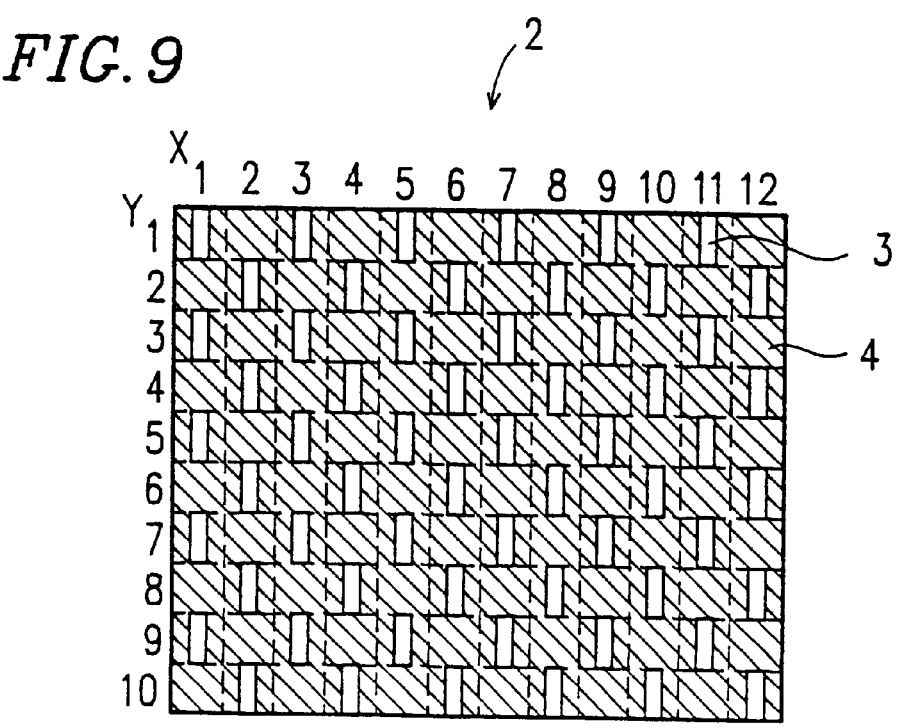
FIG. 9 is a plan view showing a pattern of the zig-zag slit panel 2 described in Example 1.

Next, the slit pattern of the slit panel 2 used in Example 1 of the present invention will be described. FIG. 9 shows the slit panel 2 used in Example 1 on which the compartmentalized plane 50 defined in FIGS. 7A and 7B is overlapped. In FIG. 9, one slit 3 is allocated to two blocks 51 along the X direction. However, the slit panel 2 differs from the conventional slit array panel 202 in that the slits 3 are positioned in a shifted manner in the X direction for each block 51 in the Y direction. The slits are arranged in a zig-zag manner in the Y direction. The positions of the slits 3 in FIG. 9 are expressed by the following Equations 3 and 4.

$$X=2I-1 (I=1,2,\ldots), \qquad \text{[Equation 3]}$$

where $Y=2J-1$ (j=1, 2 . . . )

$$X=2I (I=1,2,\ldots), \qquad \text{[Equation 4]}$$

where $Y=2J$ (j=1, 2 . . . )

In the case of the conventional slit array panel 202 shown in FIG. 8, information of the display pixels corresponding to the blocks 51 at the positions expressed by X=2I (I=1, 2, . . . ) cannot be reproduced at any position of Y. On the other hand, in the case of the slit panel 2 shown in FIG. 9, even information of the display pixels corresponding to the blocks 51 at the positions expressed by X=2I (I=1, 2, . . . ) can be reproduced. As a result, the horizontal resolution is improved to be doubled in the case of FIG. 9 as compared with the case of FIG. 8. The vertical resolution of the slit panel 2 remains the same as that of the slit array panel 202 in FIG. 8.

In the case where a conventional slit array as shown in FIG. 8 is used, light-shielding portions (non-transparent portions) 204 are continuously present between the slits 203 and take a large area relative to the total area. Therefore, the slit array panel 202 itself obstructs the observation of an image. On the other hand, if the slit panel 2 as shown in FIG. 9 is used, light-shielding portions (non-transparent portions) 4 each having a small area are separately formed over the total area. Thus, the slit panel 2 is advantageous in that the slit panel 2 itself does not obstruct the view of an image.

The thickness of the slit panel 2 is several μm in the case where the slit panel 2 is fabricated by printing the slit pattern on a surface of a glass plate using a laser beam, while the thickness is several hundred μm in the case where the slit panel 2 is made from metal material.

As described above, in Example 1 of the present invention, a spatial image is formed as follows. A discrete Fourier transformed image is formed by the liquid crystal panel 1. The slit panel 2 having a convex lens function in a horizontal direction and sampling positions arranged in a zig-zag manner is placed in front of the liquid crystal panel 1, thereby forming a spatial image. Owing to such a configuration, a wide viewing region can be obtained. By placing the slits in the slit panel 2 in a zig-zag manner, the number of sampling points in a horizontal direction increases as compared with that of the slit pattern of the conventional slit array panel. As a result, the deterioration of resolution in the horizontal direction can be reduced. Furthermore, since the area of each light-shielding portion between the slits can be reduced, the slit panel 2 can be prevented from obstructing the observation of an image.

If the sampling points are constituted by slits in this way, the three-dimensional display apparatus can be configured with ease.

EXAMPLE 2

Next, a three-dimensional display apparatus according to Example 2 of the present invention will be described. Although the basic structure of the three-dimensional display apparatus described in Example 2 is the same as that described in Example 1, the slit pattern of a slit panel 6 described in Example 2 differs from that described in Example 1.

Figure 10:
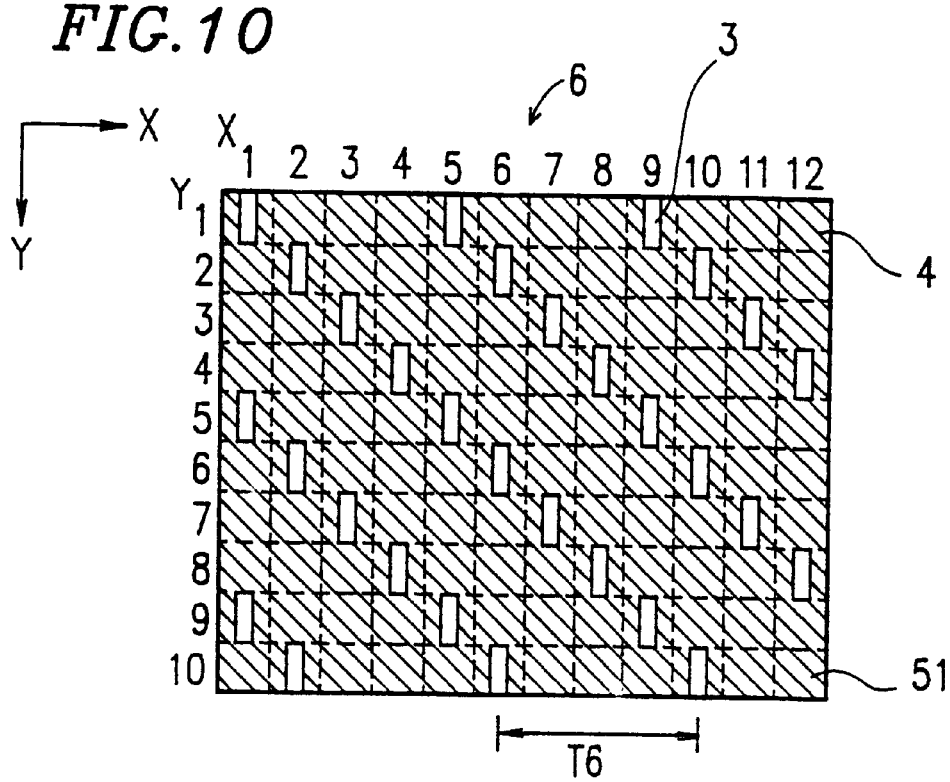
FIG. 10 is a plan view showing a slit pattern of a slit panel 6 described in Example 2.

FIG. 10 shows the slit panel 6 according to Example 2 on which the compartmentalized plane 50 defined in FIGS. 7A and 7B is overlapped.

In FIG. 10, each slit 3 has a length equal to the length of one block 51 in the Y direction. One slit 3 is allocated to four blocks 51 along the X direction for each Y coordinate. The slit panel 6 has a slit pitch T6 in the X direction. The value of X coordinate of the slit 3 is determined in accordance with the value of Y coordinate. The slits 3 are arranged on every four or more blocks 51 along the Y direction in a periodic manner.

On the other hand, in the case where two horizontal patterns of positions of slits, Y=2J-1 and 2J (J=1, 2, ...) are used while one slit is allocated to every four or more blocks, the horizontal resolution is improved to be doubled at most as compared with the case where the conventional slit array is used. In Example 2, however, if the number of blocks included in one cycle along the Y direction and the number of blocks allocated to one slit are set equal to each other, the horizontal resolution can be further improved.

The positions of slits in FIG. 10 are expressed by the following Equations 5, 6, 7 and 8.

$$X=4I-3 (I=1,2,\ldots),\qquad\text{[Equation 5]}$$

where
Y=4J-3 (J=1, 2, ...)

$$X=4I-2 (I=1,2,\ldots),\qquad\text{[Equation 6]}$$

where
Y=4J-2 (J=1, 2, ...)

$$X=4I=1,2,\ldots),\qquad\text{[Equation 7]}$$

where

Y=4J-1 (J=1, 2, ...)

$$X=4I (I=1,2,\ldots),\qquad\text{[Equation 8]}$$

where
Y=4J (J=1, 2, ...)

In the case where the conventional slit array panel having slits formed in a stripe-shaped manner along the Y-direction of the panel is used, the slits are only present at the positions expressed by, for example, X=4I-3 (I=1, 2, ...) if one slit is allocated to four blocks in the X direction. In the case where the slit panel 6 is used, the horizontal resolution is quadrupled as compared with the case where such a conventional slit array panel is used.

EXAMPLE 3

Next, a three-dimensional display apparatus according to Example 3 of the present invention will be described. Although the basic structure of the three-dimensional display apparatus described in Example 3 of the present invention is the same as that described in Example 1, the slit pattern of the slit panel 7 differs from those of the slit panels described in Examples 1 and 2.

Figure 11:
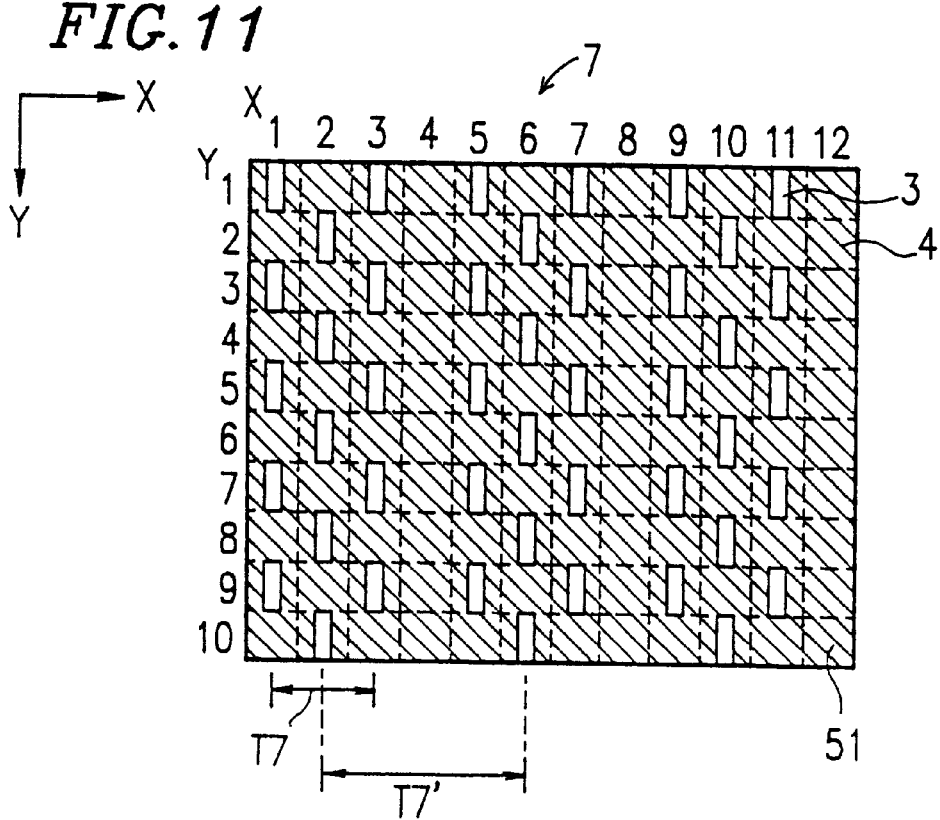
FIG. 11 is a plan view showing a slit pattern of a slit panel of a three-dimensional display apparatus described in Example 3.

With reference to FIG. 11, the slit pattern of the slit panel 7 will be described. On the slit panel 7, two different slit pitches T7 and T7' are alternately repeated. Specifically, a pattern in which two blocks are allocated to one slit 3 along the X direction and a pattern in which four blocks are allocated to one slit 3 are alternately combined. The positions of slits 3 in FIG. 11 are expressed by the following Equations 9 and 10.

$$X=2I-1 (I1,2,\ldots),\qquad\text{[Equation 9]}$$

where
Y=2J-1 (J=1, 2, ...)

$$X=4I-2 (I=1,2,\ldots),\qquad\text{[Equation 10]}$$

where
Y=2J (J=1, 2, ...)

Although the resolution in the depth direction is more improved as the number of display pixels allocated to one slit is increased in the method of Example 3, the horizontal resolution is more adversely deteriorated. In the slit panel 7 shown in FIG. 11, the pattern in which two blocks are allocated to one slit 3 has the effect of improving the horizontal resolution while the pattern in which four blocks are allocated to one slit 3 has the effect of improving the resolution in the depth direction. As a result, the three-dimensional display apparatus using the slit panel 7 shown in FIG. 11 can reproduce a stereoscopic image having well-balanced horizontal resolution and depth resolution.

EXAMPLE 4

Next, a three-dimensional display apparatus according to Example 4 of the present invention will be described. Although the basic structure of the three-dimensional display apparatus described in Example 4 of the present invention is the same as that described in Example 1, the slit pattern of a slit panel 8 differs from those of the slit panels described in Examples 1 to 3.

Figure 12:
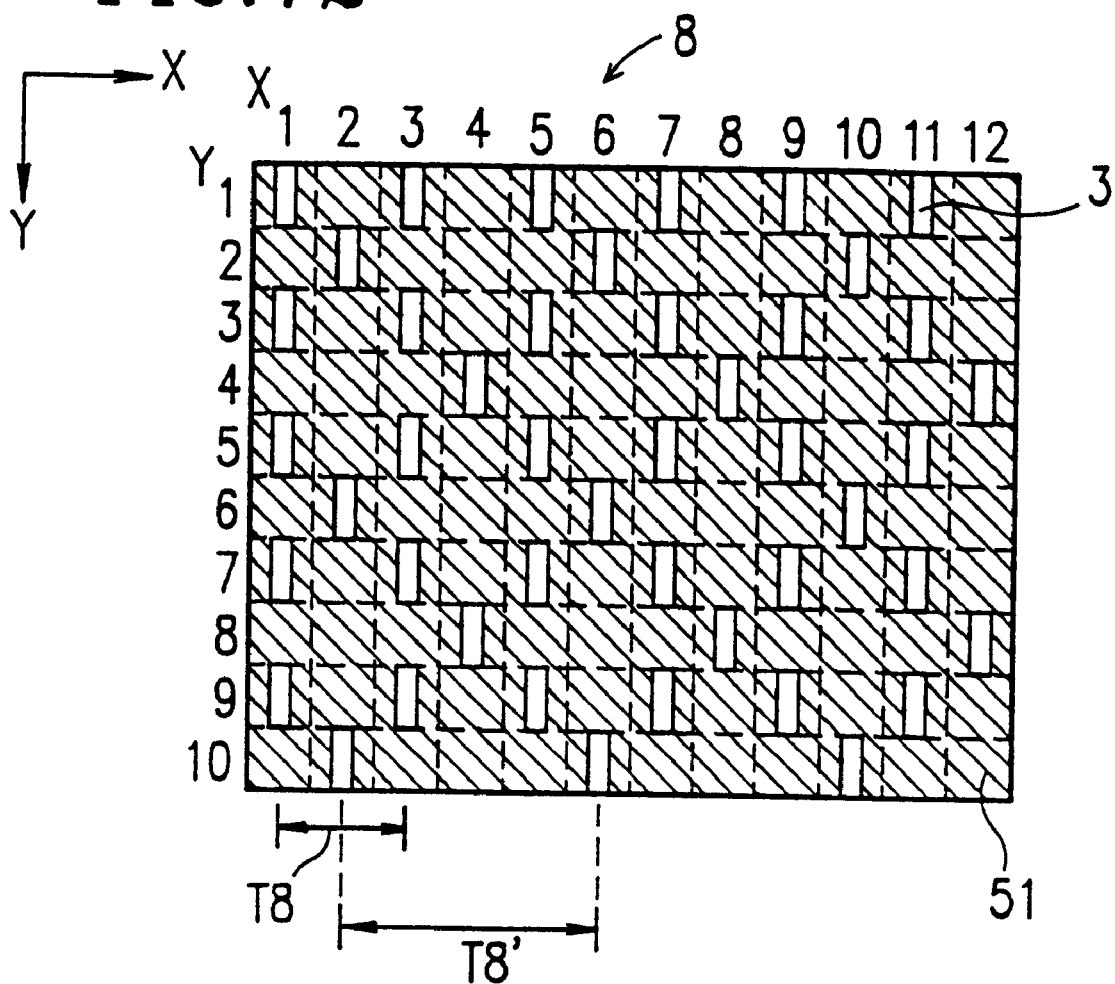
FIG. 12 is a plan view showing a slit pattern of a slit panel of a three-dimensional display apparatus described in Example 4.

With reference to FIG. 12, the slit pattern of the slit panel 8 will be described. On the slit panel 8, two different slit pitches T8 and T8' are alternately repeated. The slit pattern of the slit panel 8 shown in FIG. 12 differs from that of the slit panel 7 shown in FIG. 11 in the following ways. Since the slit panel 7 shown in FIG. 11 does not have slits at the positions expressed by X=4I (I=1, 2, . . . ), information of the display pixels corresponding to the positions of the blocks which do not have any slit cannot be reproduced. In order to solve this problem, the slits present at the positions expressed by Y=4i are translated in the X direction so that slits are also placed at the positions expressed by X=4I (I=1, 2, . . . ). Therefore, the positions of the slits in FIG. 12 are expressed by the following Equations 11, 12 and 13.

$$X=2I-1(I=1,2,\ldots),\qquad\text{[Equation 11]}$$

where

Y=2J−1 (J=1, 2, . . . )

$$X=4I(I=1,2,\ldots),\qquad\text{[Equation 12]}$$

where

Y=4J−2 (J=1, 2, . . . )

$$X=4I(I=1,2,\ldots),\qquad\text{[Equation 13]}$$

where

Y=4J (J=1, 2, . . . )

Owing to such a slit pattern, the horizontal resolution can be improved as compared with the case of the slit pattern shown in FIG. 11.

Figure 13:
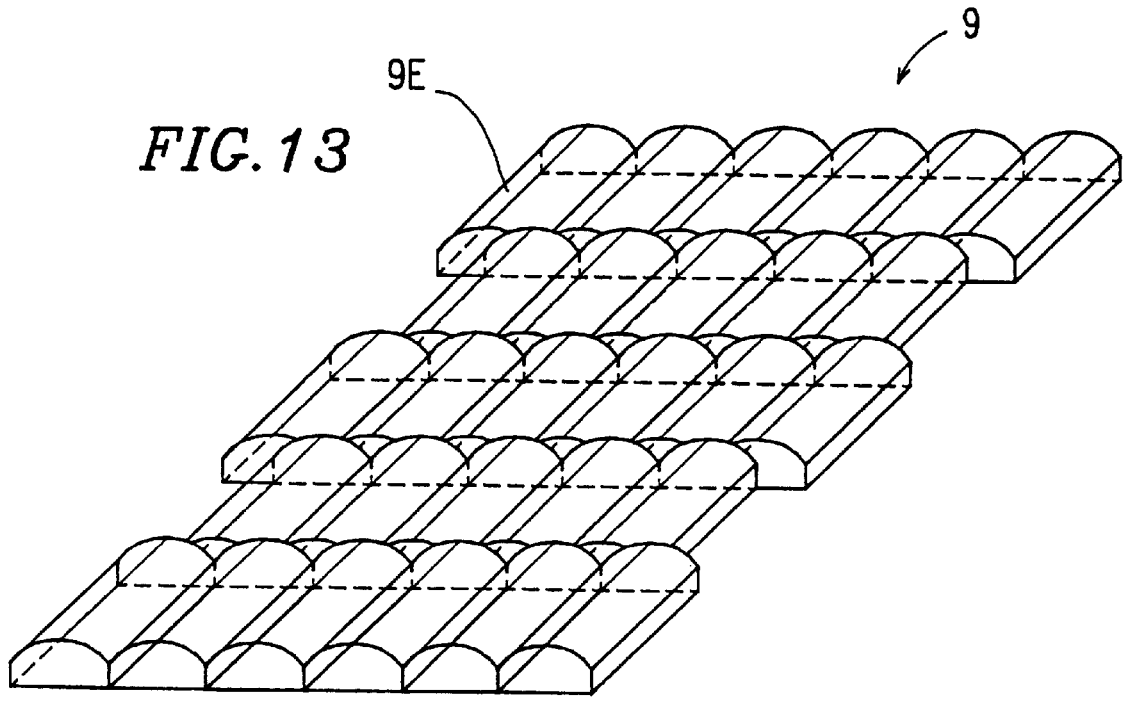
FIG. 13 is a perspective view showing a zig-zag cylindrical lens array which can be used in place of a slit panel in a three-dimensional display apparatus according to the present invention.

The slits 3 according to the aforementioned examples are equivalent to cylindrical lenses in terms of function. Therefore, the arrangement of slits in a zig-zag pattern in the Y direction can be replaced by a plurality of cylindrical lenses arranged in a zig-zag manner in the Y direction. FIG. 13 shows a cylindrical lens array 9 having the same function as that of the slit panel 2 shown in FIG. 9. A plurality of cylindrical lenses 9E of the cylindrical lens array 9 are arranged in the same pattern as that of a plurality of slits 3 of the slit panel 2. In the case where the cylindrical lens array 9 is used, a distance between the liquid crystal panel 1 and the lens array 9 should be equal to a focal length of the cylindrical lenses 9E. If the cylindrical lens array 9 is used, the brightness of a reproduced image can be improved as compared with the case where the slit panel 2 is used. This results from the fact that an aperture of the cylindrical lens 9E is greater than the slit 3 in size.

In Examples 1 to 4, only the case where light beams emitted from the display pixels of the liquid crystal panel 1 pass the slit corresponding to the display pixels as shown in FIG. 4 is described. In actuality, however, light beams passing through the slit which does not correspond to the display pixels are also present. The influence of the light beams on the stereoscopic display will be described with reference to FIG. 14.

Figure 14:
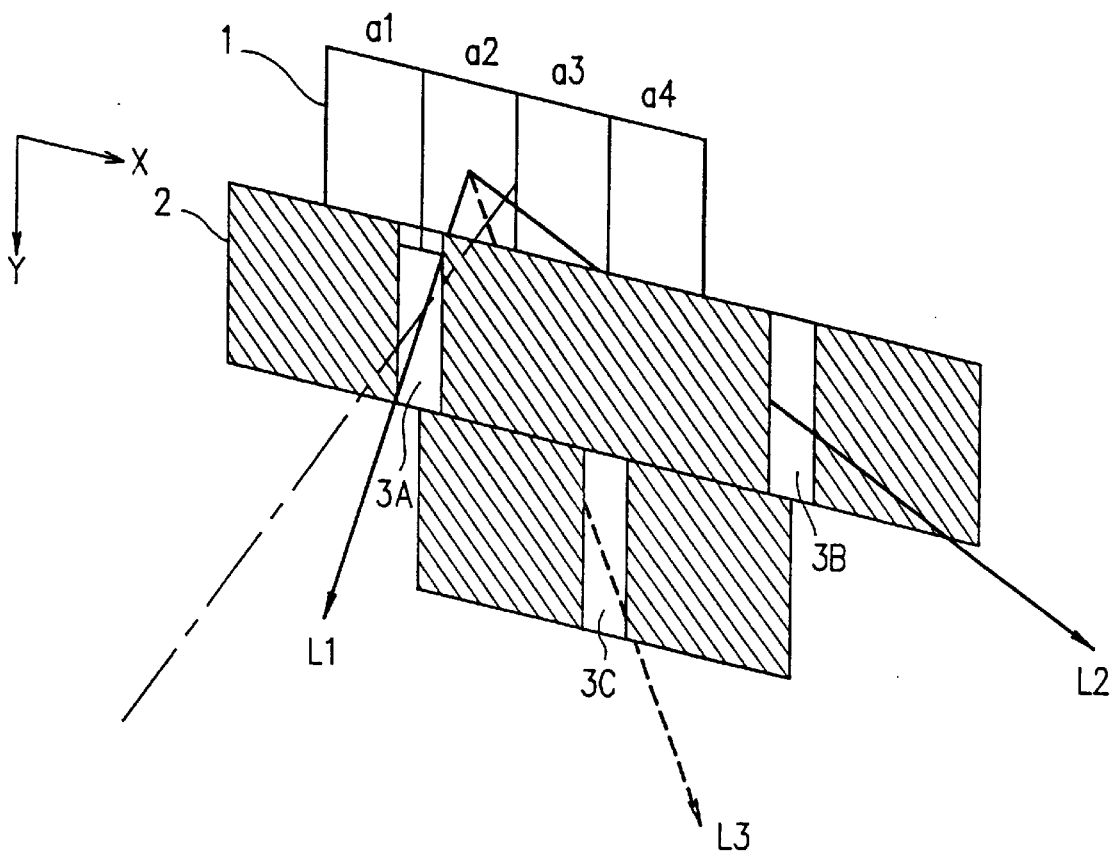
FIG. 14 is a schematic view illustrating vertical crosstalk through the zig-zag slit panel 2 in a three-dimensional display apparatus according to the present invention.
Figure 15:
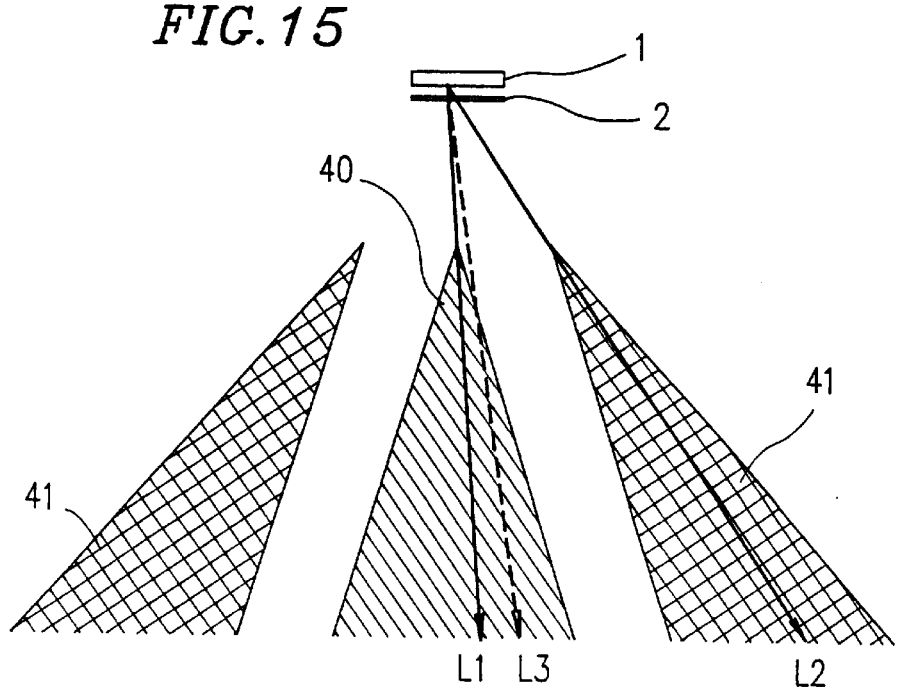
FIG. 15 is a schematic view showing a viewing region in a stereoscopic image display section of a three-dimensional display apparatus of the present invention.

In FIG. 14, the display pixels a1 to a4 of the liquid crystal display 1 correspond to the slit 3A. The light beams emitted from the display pixels a1 to a4 pass through the slit 3A. However, there are light beams which pass through a slit 3B adjacent to the slit 3A in a horizontal direction (that is, the X direction) and a slit 3C adjacent to the slit 3A in a vertical direction (that is, the Y direction). In FIG. 14, the light beams emitted from the display pixel a2 are indicated with arrows L1 and L2 in solid lines and an arrow L3 in a dotted line. The light beam L2 passing through the slit 3B adjacent to the slit 3A in the horizontal direction forms a viewing region different from that in front of the slit 3A. Thus, the light beam L2 does not obstruct the observation of a stereoscopic image. The light beam L2 passing through the slit 3B is rather advantageous in extending the viewing region. Hereinafter, a light beam passing through the slit corresponding to the display pixels is denoted as a main lobe, and a light beam passing through the slit adjacent to the slit corresponding to the display pixels is denoted as a side lobe. As shown in FIG. 15, the viewing region corresponding to one slit is constituted by a main lobe region 40 and side lobe regions 41 formed on both sides of the main lobe region 40.

On the other hand, the light beam L3 passing through the slit 3C adjacent in the vertical direction (that is, in the Y direction) reaches the main lobe region 40 at an angle different from that of the light beam L1, as indicated with a dotted line in FIG. 15. As a result, since the image perceived by the observer is duplicated, that is, crosstalk occurs, observation of the stereoscopic image is obstructed. Therefore, in the following examples, the light beam L3 passing through the slit 3C adjacent the slit 3A in the vertical direction is blocked or reduced.

EXAMPLE 5

Hereinafter, a three-dimensional display apparatus according to Example 5 of the present invention will be described.

Figure 16:
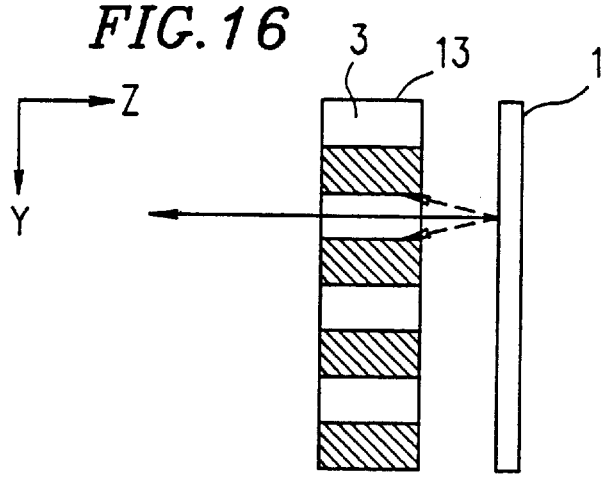
FIG. 16 is a longitudinal cross-sectional view showing an example of the configuration of a stereoscopic image display section of a three-dimensional display apparatus according the present invention and described in Example 5.

FIG. 16 is a longitudinal cross-sectional view showing an example of the configuration of a stereoscopic image display section of a three-dimensional display apparatus according to Example 5 of the present invention. A slit panel 13 having a predetermined thickness is placed in front of the liquid crystal panel 1. The slit panel 13 may have any one of the slit patterns of the slit panels shown in FIGS. 9 to 12.

As shown in FIG. 16, the slit panel 13 has a thickness of several hundred μm to several mm in the depth direction. The distance between a light outgoing face of the slit panel 13 and the liquid crystal panel 1 is equal to that between the light outgoing face of the slit panel and the liquid crystal panel 1 described in Examples 1 to 4. The thickness of the slit panel 13 depends mainly on the distance between the slit panel 13 and the liquid crystal panel 1, the width of the slits 3, and the width of the pixel group 1a. For instance, in the case where the distance between the slit panel 3 and liquid crystal panel 1 is 3 mm, the width of the slits 3 is 60 μm, and the width of the pixel group 1a is 1.6 mm, it is preferable that the thickness of the slit panel 13 is about 250 μm. If the thickness of the slit panel 13 is below the optimum thickness range, the light beams passing through the vertically adjacent slit cannot be sufficiently blocked. On the other hand, if the thickness of the slit panel 13 exceeds the optimum thickness, the light passing through the intended slits 3 is adversely blocked. Owing to such a structure, the components of light travelling in the vertical direction (Y direction) can be blocked by the slit panel 13, thereby eliminating the crosstalk in the vertical direction.

EXAMPLE 6

Next, a three-dimensional display apparatus according to Example 6 of the present invention will be described below.

Figure 17:
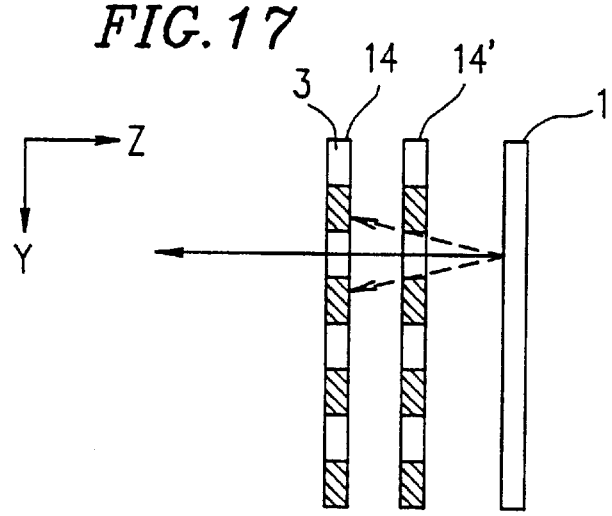
FIG. 17 is a longitudinal cross-sectional view showing another example of the configuration of a stereoscopic image display section of a three-dimensional display apparatus according to the present invention and described in Example 6.

In FIG. 17, two slit panels 14 and 14' are placed in front of the liquid crystal panel 1 so as to be at a predetermined distance from each other. The slit panels 14 and 14' may have any slit pattern of the slit panels shown in FIGS. 9 to 12, and may be identical with each other. The distance between the slit panels 14 and 14' are in the range from several hundreds of μm to several mm. In this case, the distance between the two slit panels 14 and 14' depends mainly on the distance between the slit panel 14' and the liquid crystal panel 1, the width of the slits 3, and the width of the pixel group 1a. The optimum distance between the two slit panels 14 and 14' are almost identical to the optimum thickness of the slit panel 13, if the above dimensions are identical to those of Example 5. Alternatively, the function of the slit panels 14 and 14' shown in FIG. 17 can be obtained by printing the slit pattern on both surfaces of a glass plate using a laser beam. In such a case, the components of light travelling in a vertical direction can be blocked owing to the structure of slit panels 14 and 14' as described above. As a result, the crosstalk can be reduced. The combination of the slit panels 14 and 14' is advantageous over the slit panel 13 shown in FIG. 16 according to Example 5 in the fabrication with high accuracy and reduced total weight, because the each of the slit panels are thin.

EXAMPLE 7

Next, a three-dimensional display apparatus according to Example 7 of the present invention will be described.

Figure 18:
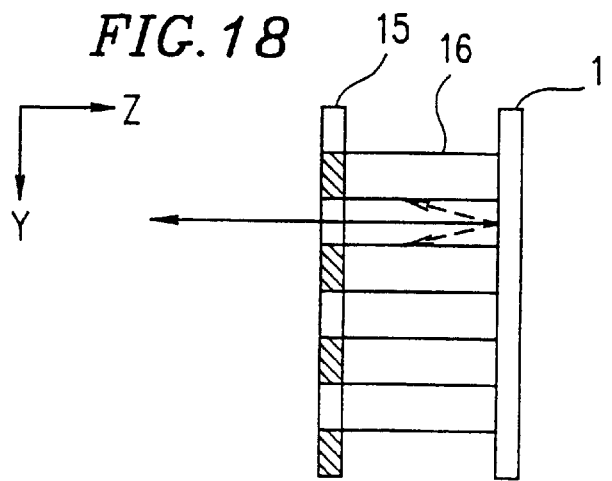
FIG. 18 is a longitudinal cross-sectional view showing still another example of the configuration of a stereoscopic image display section of a three-dimensional display apparatus according to the present invention and described in Example 7.

In FIG. 18, a slit panel 15 is placed in front of the liquid crystal panel 1. Light-shielding films 16 for removing the crosstalk in the vertical direction are interposed between the liquid crystal panel 1 and the slit panel 15. The slit panel 15 may have any one of the slit patterns of the slit panels shown in FIGS. 9 to 12. The light-shielding films 16 are extremely thin, having a thickness in the range of several $\mu$m to several tens of $\mu$m. The light-shielding films 16 are aligned with the horizontal boundaries of the display pixels of the liquid crystal panel 1 for each display line. Such alignment results in alignment of the light-shielding films 16 with the horizontal boundaries of blocks of the slit panel 15. The planes of the light-shielding film 16 are perpendicular to the plane of the paper on which FIG. 18 is printed. As a result, the components of light travelling in a vertical direction can be blocked, thereby eliminating the crosstalk only in the vertical direction.

EXAMPLE 8

Furthermore, a three-dimensional display apparatus according to Example 8 of the present invention will be described below.

Figure 19:
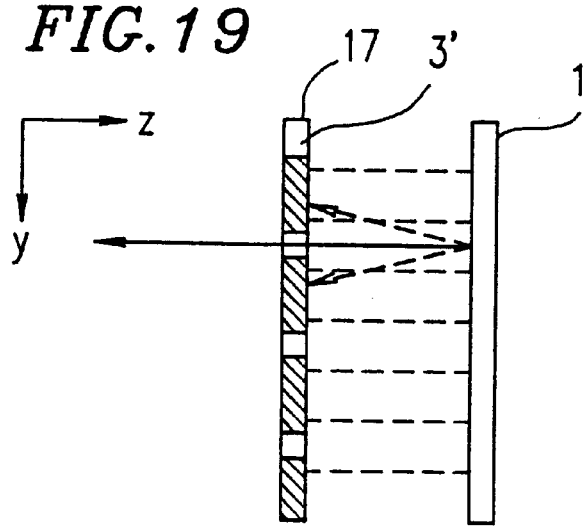
FIG. 19 is a longitudinal cross-sectional view showing still another example of the configuration of a stereoscopic image display section of a three-dimensional display apparatus according to the present invention and described in Example 8.
Figure 20:
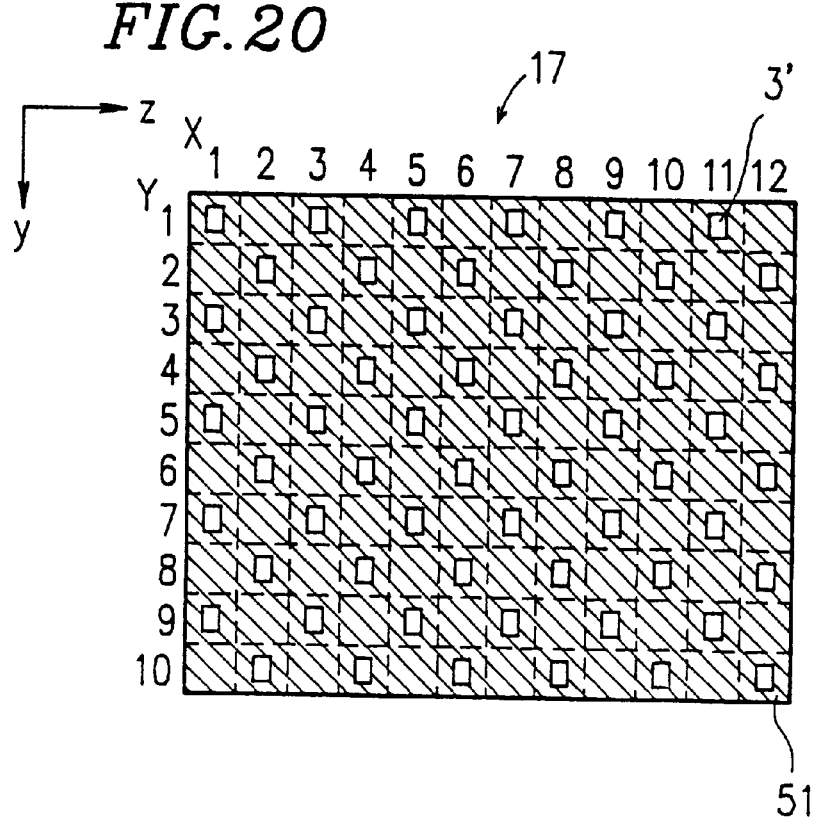
FIG. 20 is a plan view showing a pattern of a zig-zag slit panel used in a stereoscopic image display section of the three-dimensional display apparatus shown in FIG. 19.

In FIG. 19, a slit panel 17 having small openings is placed in front of the liquid crystal panel 1. The slit pattern of the slit panel 17 may be any one of the slit patterns of the slit panels shown in FIGS. 9 to 12. In the slit panel 17, a length of the slit 3' in the Y direction is shorter than that of one block in the Y direction. More specifically, the length of the slit in the Y direction is shorter than the length of one display pixel of the liquid crystal panel 1 in the Y direction. FIG. 20 shows the application of the slit pattern of the slit panel shown in FIG. 9 to the slit panel 17. As can be seen from FIG. 20, the length of each of the slits 3' in the Y direction is shorter than that of the slits of the slit array panel 2 shown in FIG. 9. Owing to such a configuration, reduction of the crosstalk in the vertical direction can be realized with a small thickness of the slit panel 17.

EXAMPLE 9

Figure 21:
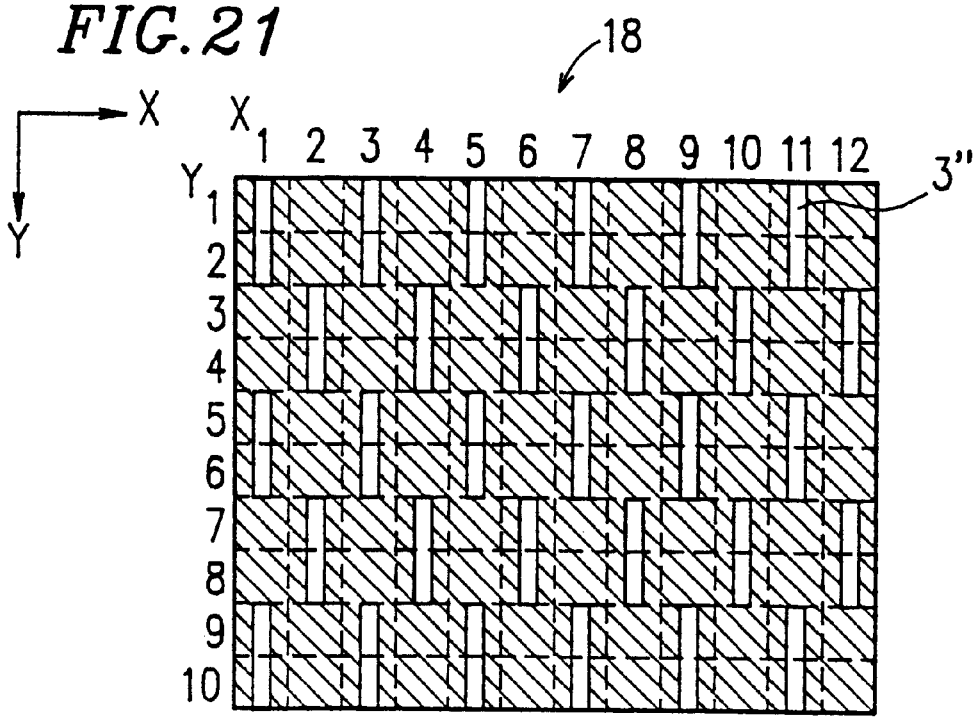
FIG. 21 is a plan view showing a pattern of a zig-zag slit panel of a three-dimensional display apparatus according to the present invention and described in Example 9.

A three-dimensional display apparatus according to Example 9 of the present invention will be described below. The basic structure of the three-dimensional display apparatus according to Example 9 is the same as that described in Example 1 shown in FIG. 1. As shown in FIG. 21, the slit pattern of the slit panel 18 differs from that of the slit pattern of the slit panel described in Example 8.

As can be seen from FIG. 21, a slit panel 18 has slits 3" each being formed over a plurality of blocks in the Y direction. More specifically, a length of one slit 3" in the Y direction corresponds to a length of two blocks in the Y direction. The positions of the slits 3" in FIG. 21 can be expressed by the following Equations 14 and 15.

$$X=2I-1(I=1,2,\ldots),\qquad\text{[Equation 14]}$$

where
   Y=4J−3, 4j−2 (j=1, 2, . . . )

$$X=2I(I1,2,\ldots),\qquad\text{[Equation 15]}$$

where
   Y=4J−1, 4j (j=1, 2, . . . )

The crosstalk in the vertical direction limitedly occurs at the position where the horizontal pattern of the positions of the slits 3" changes. For example, in the case of the conventional slit array as shown in FIG. 8, the horizontal pattern does not change even when the value of Y varies. Therefore, the crosstalk in the Y direction does not occur. In the case of the slit panel 2 shown in FIG. 9, however, the horizontal pattern of the lines adjacent in the Y direction differs for all values of Y (that is, the horizontal pattern changes every one block in the vertical direction). Therefore, the crosstalk occurs in the all Y coordinates. On the other hand, in the case of the slit panel 18 of FIG. 21, the horizontal pattern changes every two blocks in the Y direction. Thus, the degree of change of the horizontal pattern is halved as compared with the case of the slit panel 2 shown in FIG. 9. As a result, the occurrence of crosstalk in the vertical direction is halved as compared with the case of the slit panel 2 shown in FIG. 9.

In this way, the slit panel 18 includes the slits 3" each being formed over a plurality of lines of the image display device in the Y direction (that is, the vertical direction). As a result, the crosstalk in the vertical direction can be more effectively reduced.

EXAMPLE 10

Figure 22:
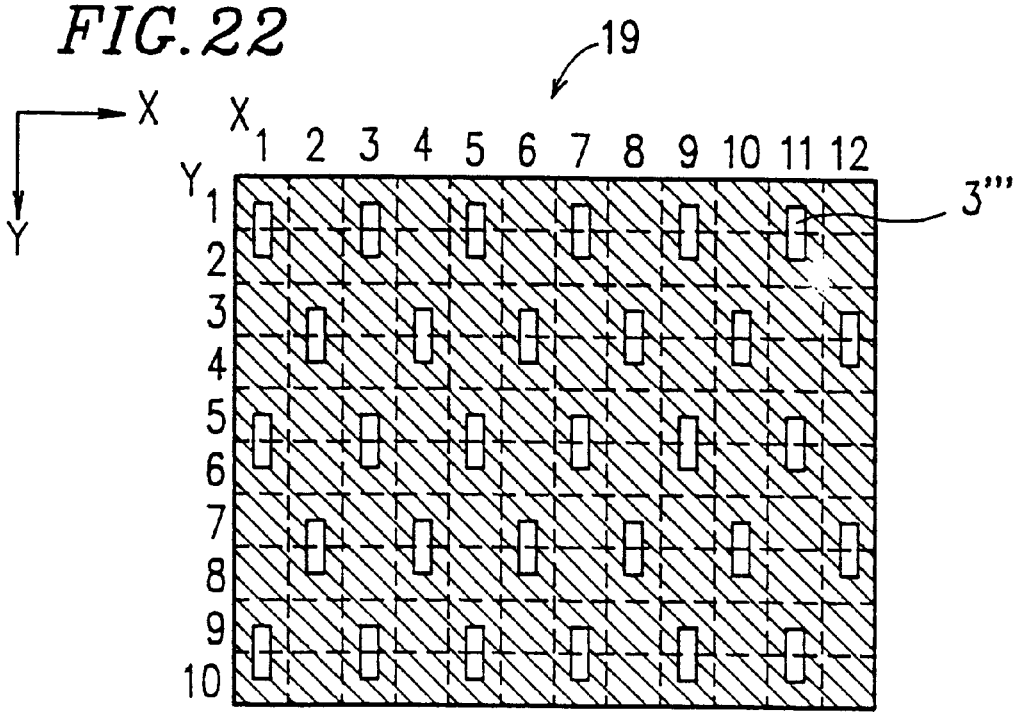
FIG. 22 is a plan view showing a pattern of a zig-zag slit panel of a three-dimensional display apparatus according to the present invention and described in Example 10.

A three-dimensional display apparatus according to Example 10 of the present invention will be described. The basic structure of the three-dimensional display apparatus and described in Example 10 is the same as that shown in FIG. 1 and described in Example 1. As shown in FIG. 22, however, the slit pattern of the slit panel 19 differs from the slit patterns of the slit panels described in Examples 8 and 9.

Although the pattern of the slits 3''' in FIG. 22 is the same as that shown in FIG. 21, a length of one slit 3''' in the Y direction is shorter than a length of two blocks in the Y direction. Owing to such a length of the slit, the effect of Example 9 is advantageously added to the effect of Example 8 in Example 10. As a result, the crosstalk in the vertical direction can be more effectively reduced.

EXAMPLE 11

A three-dimensional display apparatus according to Example 11 of the present invention will be described.

Figure 23:
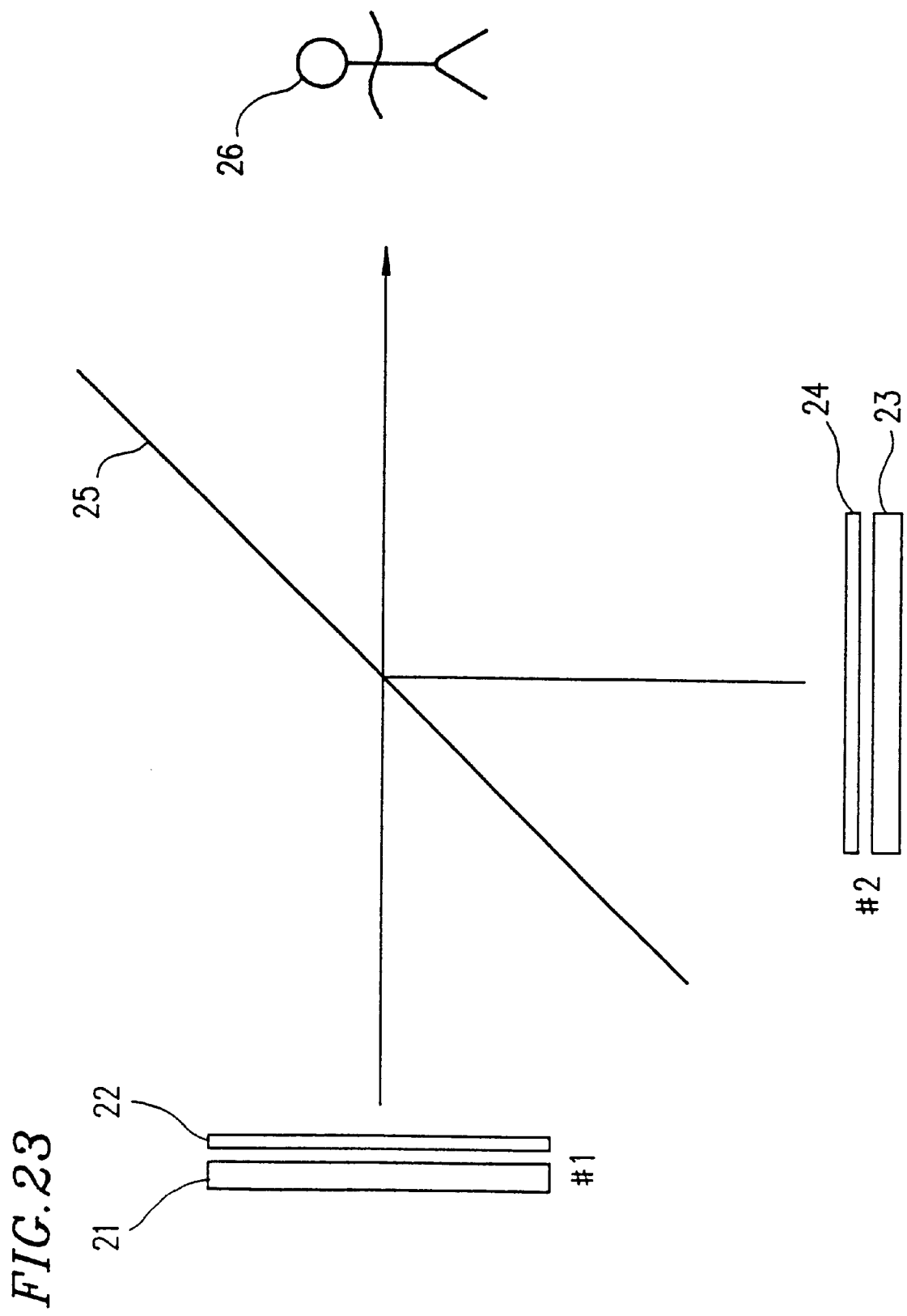
FIG. 23 is a longitudinal cross-sectional view showing an example of the configuration of a stereoscopic image display section of the three-dimensional display apparatus according to the present invention and described in Example 11.

As shown in FIG. 23, the three-dimensional display apparatus according to Example 11 applies the combination of a pair of image display sections 10 described in Example 1. More specifically, a set (#1) of a liquid crystal panel 21 and a slit panel 22 placed in front of the liquid crystal panel 21 and a set (#2) of a liquid crystal panel 23 and a slit panel 24 placed in front of the liquid crystal panel 23 are optically coupled with each other by a beam combiner 25. An observer 26 observes an image obtained by synthesizing a stereoscopic image generated by the set #1 and another stereoscopic image generated by the set #2.

Figure 24A:
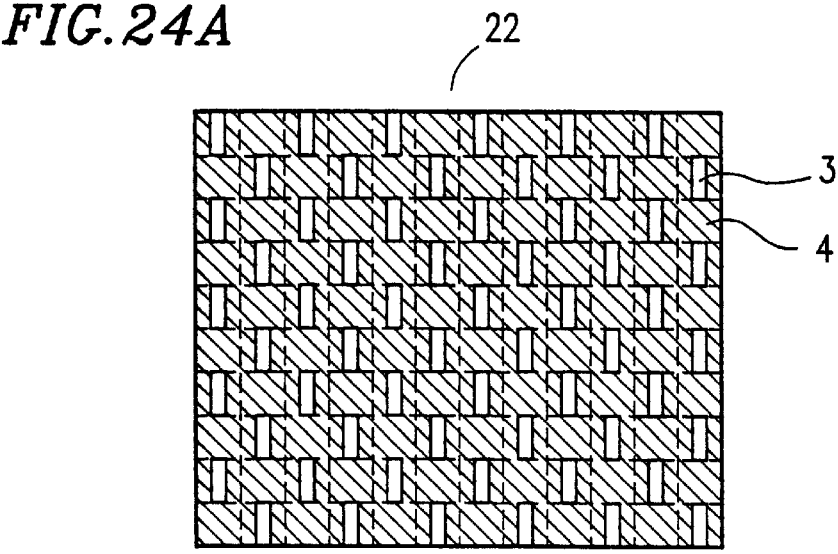
FIG. 24A is a plan view showing a slit pattern of a zig-zag slit panel 22 shown in FIG. 23.
Figure 24B:
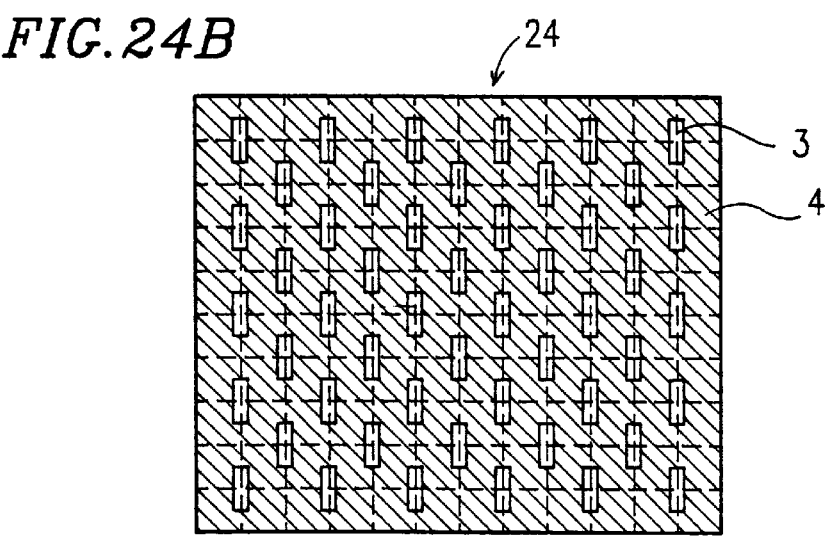
FIG. 24B is a plan view showing a slit pattern of a zig-zag slit panel 24.
Figure 24C:
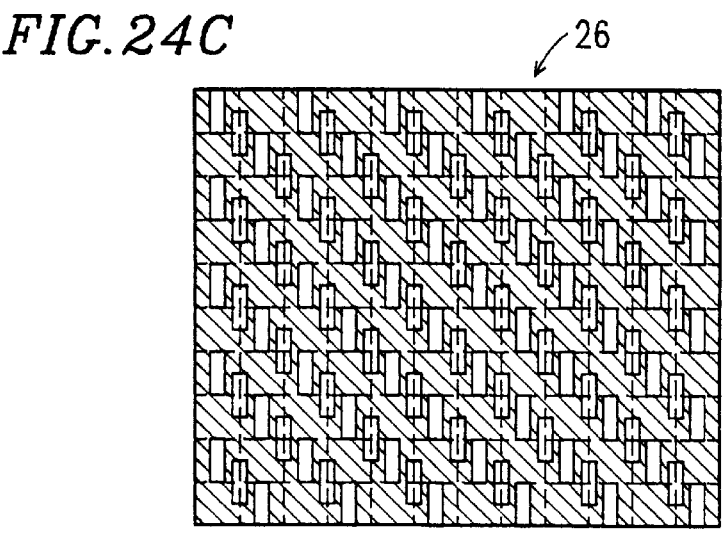
FIG. 24C is a plan view showing a slit pattern obtained by synthesizing the patterns shown in FIGS. 24A and 24B.
Figure 25:
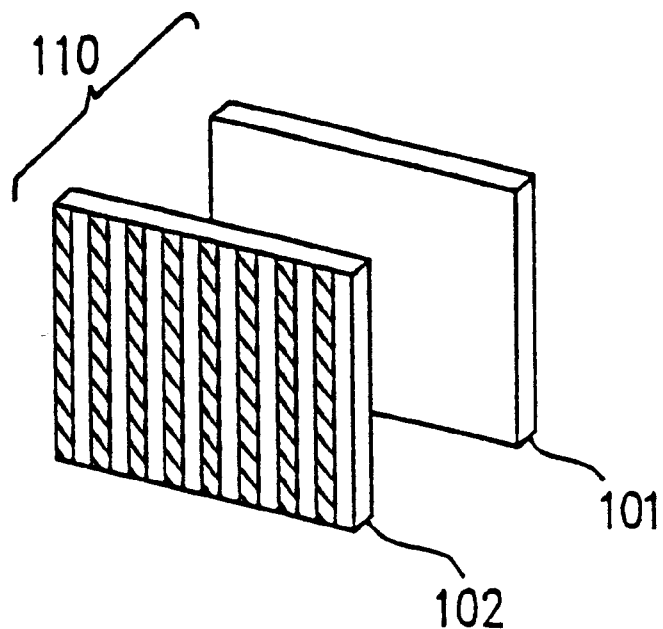
FIG. 25 is a schematic view showing the basic structure of a stereoscopic image display section in a conventional three-dimensional display apparatus.
Figure 26:
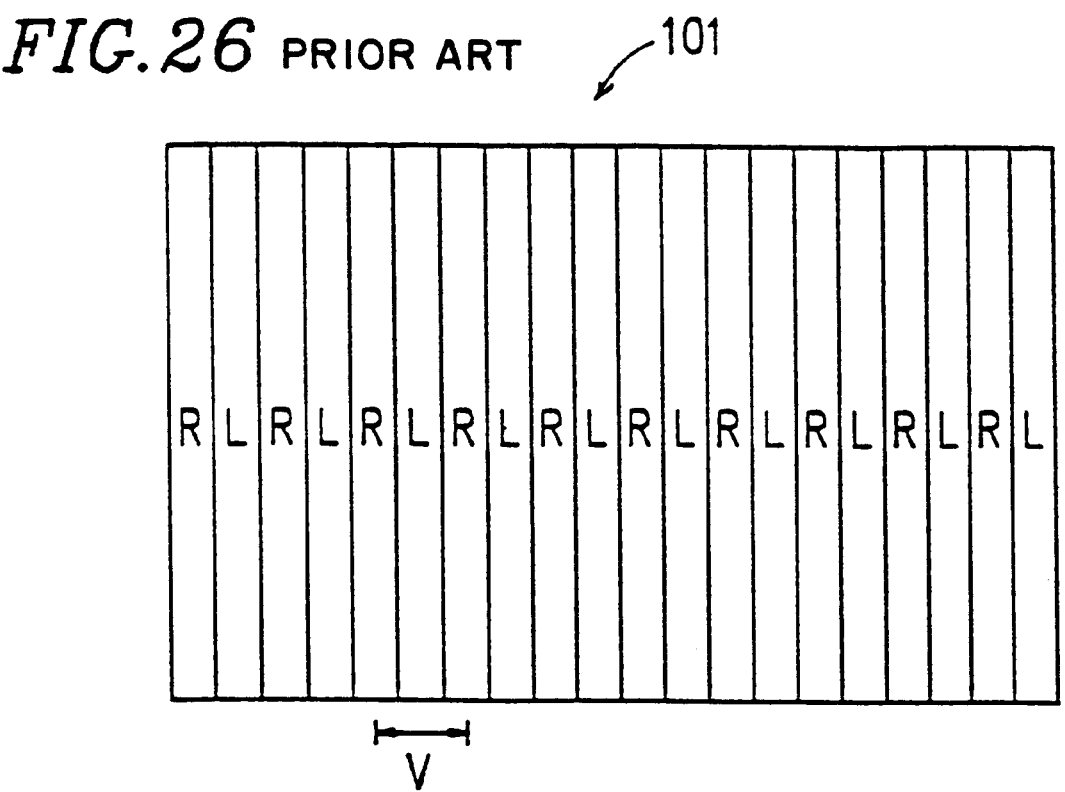
FIG. 26 is a plan view illustrating a strip-shaped image section for performing display on a liquid crystal panel 101 shown in FIG. 25.
Figure 27:
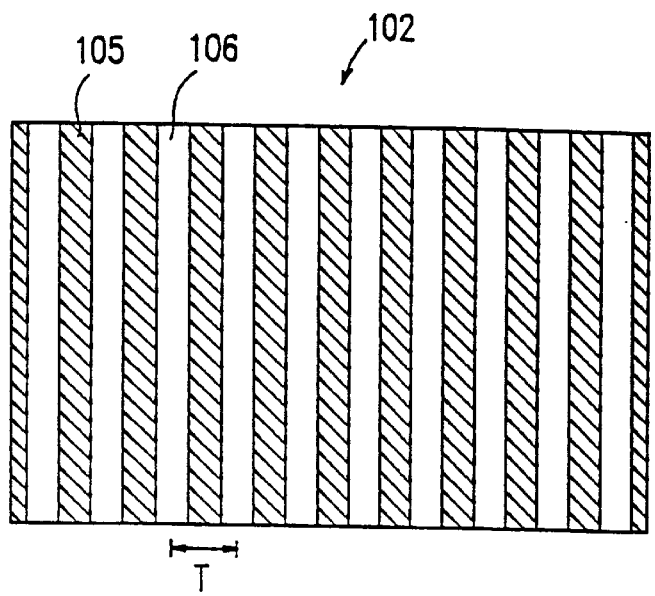
FIG. 27 is a plan view showing a slit pattern of a slit array panel 102 shown in FIG. 25.
Figure 28:
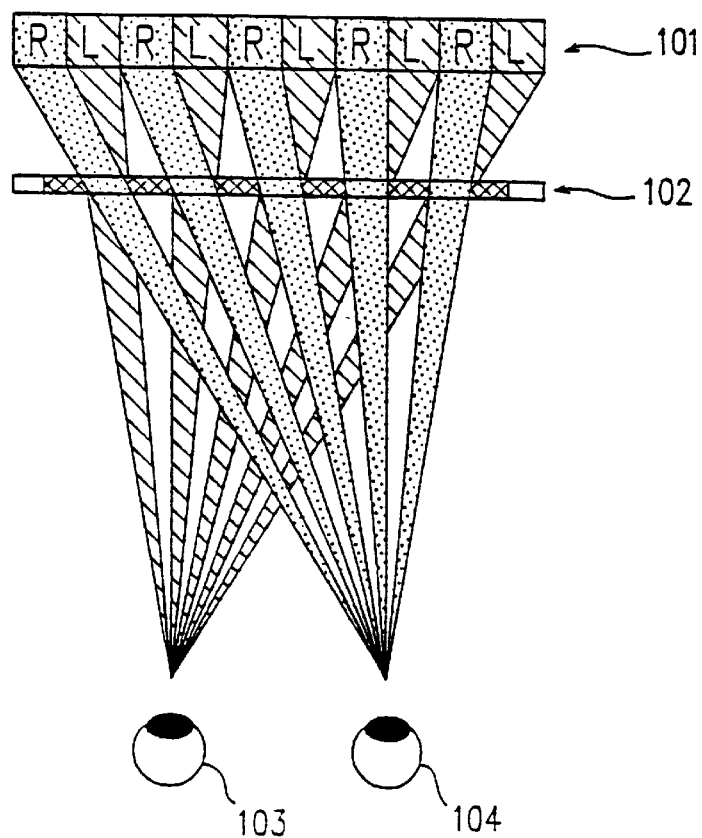
FIG. 28 is a schematic view showing the principle of a stereoscopic view in a conventional three-dimensional display apparatus in a parallax image mode.

An example of the slit pattern of the slit panel 22 of the set #1 is shown in FIG. 24A, while an example of the slit pattern of the slit panel 24 of the set #2 is shown in FIG. 24B. Broken lines are commonly drawn in FIGS. 24A and 24B for comparison of the slit positions in FIGS. 24A and 24B. The slit pattern shown in FIG. 24B is obtained by vertically and horizontally shifting the slit pattern shown in FIG. 24A by a half pitch. If these two slit patterns are synthesized by the beam combiner 25, the synthesized slit pattern as shown in FIG. 24C is generated. With the slit pattern shown in FIG. 24C, the horizontal resolution is improved to be doubled as compared with that obtained with the slit pattern shown in FIG. 24A.

Alternatively, the synthesized slit pattern as shown in FIG. 24C can be obtained by using two identical slit patterns instead of using two different slit patterns as described above. In such a case, the slit panel 24 of the set #2 has the same zig-zag slit pattern as that of the slit panel 22 of the set #1. Upon synthesizing the two slit patterns, the position of the slit panel 24 of the set #2 is translated by a half pitch, thereby generating the synthesized slit pattern as shown in FIG. 24C. Since Example 11 is intended to improve the horizontal resolution, it is required that the slit positions of the sets do not overlap each other in the horizontal direction. On the other hand, the pixels in the Y direction are not restrained from overlapping.

The discrete Fourier transformed image displayed on the liquid crystal panel 21 of the set #1 and that displayed on the liquid crystal panel 23 of the set #2 should correspond to the slit positions after synthesis, respectively. More specifically, the sampling positions of the discrete Fourier transformed image displayed on the liquid crystal panel 21 of the set #1 should be shifted from those of the discrete Fourier transformed image displayed on the liquid crystal panel 23 of the set #2 in horizontal and vertical directions by a half pitch.

Although the case where a discrete Fourier transformed image is displayed is described in the aforementioned examples, the configurations as described in the examples of the present invention are applicable even to the case where a parallax image is to be displayed and the same effect can be obtained thereby.

In the aforementioned examples, the distance between the slit panel and the liquid crystal panel is in the range from several mm to several cm. The width of the slits is about 20–40% of the pixel pitch of the display panel. In the case of utilizing the liquid crystal panel 1, the width is in the range from several ten to several hundred $\mu$m. These values are not limited to the above ranges, but may vary depending on the size of the display panel 1, the pitch of pixels, the observing distance, the number of the pixels which constitute the pixel group 1a, and so on.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A three-dimensional display apparatus comprising at least one image display device, the image display device including a display device and an optical device, wherein the display device includes a plurality of pixel groups, each including a plurality of display pixels arranged in a first direction, the optical device includes a plurality of sampling portions transmitting light, arranged in the first direction and in a second direction orthogonal to the first direction, each being optically coupled with each of the plurality of pixel groups, and the sampling portions adjacent each other in the second direction are disposed at different positions in the first direction, wherein each of the plurality of sampling portions is a slit which is long in a second direction perpendicular to the first direction, and a length of the slit is shorter than a length of each of the plurality of pixel groups along the second direction.

2. A three-dimensional display apparatus according to claim 1, wherein each of the plurality of sampling portions is a cylindrical lens.

3. A three-dimensional display apparatus according to claim 1, wherein the display device displays a discrete Fourier transformed image.

4. A three-dimensional display apparatus according to claim 1, wherein the display device displays an image containing parallax information.

5. A three-dimensional display apparatus according to claim 1, wherein the optical device includes a plurality of first lines each being provided with a plurality of sampling portions at a first pitch and a plurality of second lines each being provided with a plurality of sampling portions at a second pitch, and the plurality of first lines and the plurality of second lines are alternately provided.

6. A three-dimensional display apparatus according to claim 1, wherein positions of the plurality of sampling portions are represented by (X, Y)=(2I−1, 2J−1) and (X, Y)=(2I, 2J), where X is a position in the first direction, Y is a position in the second direction, and I and J are positive integers.

7. A three-dimensional display apparatus according to claim 1, wherein positions of the plurality of sampling portions are represented by (X, Y)=(4I−3, 4J−3), (X, Y)=(4I−2, 4J−2), (X, Y)=(4I−1, 4J−1) and (X, Y)=(4I, 4J), where X is a position in the first direction, Y is a position in the second direction, and I and J are positive integers.

8. A three-dimensional display apparatus according to claim 1, wherein positions of the plurality of sampling portions are represented by (X, Y)=(2I−1, 2J−1) and (X, Y)=(4I−2, 2J), where X is a position in the first direction, Y is a position in the second direction, and I and J are positive integers.

9. A three-dimensional display apparatus according to claim 1, wherein positions of the plurality of sampling portions are represented by (X, Y)=(2I−1, 2J−1), (X, Y)=(4I−2, 4J−2) and (X, Y)=(4I, 4J), where X is a position in the first direction, Y is a position in the second direction, and I and J are positive integers.

10. A three-dimensional display apparatus according to claim 1, wherein positions of the plurality of sampling portions are represented by (X, Y)=(2I−1, 4J−3), (X, Y)=(2I−1, 4J−2), (X, Y)=(2I, 4J−1) and (X, Y)=(2I, 4J), where X is a position in the first direction, Y is a position in the second direction, and I and J are positive integers.

11. A three-dimensional display apparatus according to claim 1, wherein the optical device has a predetermined thickness along a direction perpendicular to the first direction and the second direction to prevent crosstalk in the second direction from occurring.

12. A three-dimensional display apparatus according to claim 1, further comprising another optical device to prevent crosstalk in the second direction from occurring.

13. A three-dimensional display apparatus according to claim 1, comprising a plurality of the image display devices for respectively displaying images and a beam combiner, wherein the beam combiner optically synthesizes the images displayed by the plurality of image display devices.

14. A three-dimensional display apparatus according to claim 1, wherein the image display device includes light-shielding films between the display device and the optical device, each of the light-shielding films traverses boundaries of the plurality of lines and boundaries of the plurality of pixel groups.

15. A three-dimensional display apparatus comprising at least one image display device, the image display device including a display device and an optical device, wherein the display device includes a plurality of pixel groups, each including a plurality of display pixels arranged in a first direction, the optical device includes a plurality of sampling portions transmitting light, arranged in the first direction and in a second direction orthogonal to the first direction, each being optically coupled with each of the plurality of pixel groups, and the sampling portions adjacent each other in the second direction are disposed at different positions in the first direction and wherein the sampling portions are arranged in a zig-zag manner.

16. A three-dimensional display apparatus according to claim 15, wherein a length of the slit is twice a length of each of the plurality of pixel groups along the second direction.

* * * * *